US011717749B2

(12) United States Patent
Colenbrander

(10) Patent No.: US 11,717,749 B2
(45) Date of Patent: *Aug. 8, 2023

(54) CLOUD GAMING DEVICE HANDOVER

(71) Applicant: Sony Interactive Entertainment LLC, San Mateo, CA (US)

(72) Inventor: Roelof Roderick Colenbrander, Costa Mesa, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/688,723

(22) Filed: Mar. 7, 2022

(65) Prior Publication Data

US 2022/0184494 A1 Jun. 16, 2022

Related U.S. Application Data

(63) Continuation of application No. 16/812,195, filed on Mar. 6, 2020, now Pat. No. 11,285,386, which is a
(Continued)

(51) Int. Cl.
| | | |
|---|---|---|
| *A63F 9/24* | (2006.01) | |
| *A63F 11/00* | (2006.01) | |
| *G06F 13/00* | (2006.01) | |
| *G06F 17/00* | (2019.01) | |
| *A63F 13/355* | (2014.01) | |
| *H04L 65/1083* | (2022.01) | |
| *A63F 13/35* | (2014.01) | |
| *A63F 13/48* | (2014.01) | |
| *A63F 13/493* | (2014.01) | |

| | | |
|---|---|---|
| *H04L 67/303* | (2022.01) | |
| *H04L 67/141* | (2022.01) | |

(Continued)

(52) U.S. Cl.
CPC ............ *A63F 13/355* (2014.09); *A63F 13/35* (2014.09); *A63F 13/48* (2014.09); *A63F 13/493* (2014.09); *H04L 65/1086* (2013.01); *H04L 67/01* (2022.05); *H04L 67/10* (2013.01); *H04L 67/131* (2022.05); *H04L 67/141* (2013.01); *H04L 67/303* (2013.01)

(58) Field of Classification Search
CPC .............................. G07F 17/32; G07F 17/3211
USPC ............................ 463/20, 22, 25, 39, 40, 42
See application file for complete search history.

(56) References Cited

U.S. PATENT DOCUMENTS

| 11,218,522 B1* | 1/2022 | Yerli ........................ G06T 19/00 |
|---|---|---|
| 2017/0087460 A1* | 3/2017 | Perry ....................... A63F 13/35 |

(Continued)

*Primary Examiner* — Adetokunbo O Torimiro
(74) *Attorney, Agent, or Firm* — Penilla IP, APC

(57) ABSTRACT

Methods and systems to identify options of secondary client devices for a device handover of game play include establishing a session of game play of a game for a primary client device by executing the game on a server and streaming video frames to the primary client device. A profile is generated for each secondary client device that is identified to be local to the primary client device. A handover option is provided to the primary client device during game play, identifying one or more of the secondary client devices, based on the profile. A selection of a secondary client device from the handover option causes pausing of the streaming of video frames to the primary client device, accessing the game state for the game, and resuming game play using the secondary client device.

17 Claims, 10 Drawing Sheets

Related U.S. Application Data continuation of application No. 16/365,560, filed on Mar. 26, 2019, now Pat. No. 10,898,800, which is a continuation of application No. 15/141,799, filed on Apr. 28, 2016, now Pat. No. 10,238,965.

(51) Int. Cl.
*H04L 67/10* (2022.01)
*H04L 67/01* (2022.01)
*H04L 67/131* (2022.01)

(56) References Cited

U.S. PATENT DOCUMENTS

| | | | |
|---|---|---|---|
| 2021/0006544 A1* | 1/2021 | Lewin | H04L 63/20 |
| 2021/0260470 A1* | 8/2021 | Maitlen | A63F 13/327 |
| 2022/0070236 A1* | 3/2022 | Yerli | H04L 65/4053 |

\* cited by examiner

Secondary Device Profile generated by Client Device Profiler of the server

| Device ID | QOS | Streaming capability | Framerate | Device capable for game? | Device availability |
|---|---|---|---|---|---|
| D2 | Low | Yes | 24 fps | Yes | No |
| D3 | High | Yes | 50 fps | No | Yes |
| D4 | Normal | No | 30 fps | No | Yes |
| D5 | High | Yes | 60 fps | Yes | Yes |
| D6 | High | Yes | 60 fps | Yes | Yes |

Figure 6A

CLOUD GAMING DEVICE HANDOVER

CLAIM OF PRIORITY

The present application is a Continuation of U.S. patent application Ser. No. 16/812,195, filed on Mar. 6, 2020, and entitled, "Cloud Gaming Device Handover," which is a Continuation of U.S. patent application Ser. No. 16/365,560, filed on Mar. 26, 2019, (since issued as U.S. Pat. No. 10,898,800 on Jan. 26, 2021) and entitled, "Cloud Gaming Device Handover," which is a continuation of U.S. patent application Ser. No. 15/141,799, filed on Apr. 28, 2016, (since issued as U.S. Pat. No. 10,238,965 on Mar. 26, 2019) entitled "Cloud Gaming Device Handover", which are incorporated herein by reference in their entirety.

FIELD

The present disclosure relates to systems and methods for providing games for user interaction, and more specifically to providing options for selecting alternate client devices for a device handover during cloud gaming.

BACKGROUND

Description of the Related Art

One of the rapidly growing technologies is in the field of cloud gaming where users are able to access a number of games available on a cloud gaming site over a network, such as the Internet, and begin playing the game. A user accesses his/her account on the cloud gaming site and selects a game from a list of games that are available for the user account, for game play. When the user selects a game for game play from the cloud gaming site, using a client device, a server in the cloud gaming site starts a session of game play and begins streaming the video frames of the game to the client device from which the user accessed the cloud gaming site. During the session, if the user wishes to switch to a second client device for playing the game, the server on the cloud gaming site has to restart the game from the beginning so that it can start streaming the video frames to the second client device. The server has to conduct bandwidth testing and other quality of service testing before it can begin streaming the video frames of the game to the second client device. The restarting of the game and pre-testing of the second client device leads to unnecessary wait for the user, causing user frustration.

It is within this context that embodiments of the invention arise.

SUMMARY OF THE INVENTION

Embodiments of the present invention disclose methods, systems and computer readable media that are used for identifying options of alternate client devices for handing over game play of a game hosted by a cloud gaming site. The various embodiments enable a primary client device that is currently used for playing a game hosted by a cloud gaming system on a cloud gaming site, to engage in background profiling of secondary client devices that are identified to be local to the primary client device. The profiling of the secondary client devices is done to determine which ones of the secondary client devices are qualified to continue a game play session of the game, and is performed before a device handover request is received from the primary client device. The profile identifies the device attributes of each of the secondary client devices. In some embodiments, the cloud gaming system may use the profiles for provisioning services to different secondary client devices to get these secondary client devices ready for playing the game. Each game hosted by the cloud gaming system, may have its own service and attribute requirements.

Profiling allows the cloud gaming system to identify the services, device attributes available in each of the secondary client devices, and determine the services, device attributes that are not available or are not up to a level required in order for the respective secondary client devices to be used for interacting with the game executing on the cloud gaming site. The cloud gaming system, in some embodiments, may use the profile of each secondary client device to provision appropriate resources so as to boost the services or device attributes of specific ones of the secondary client devices. Such provisioning may be performed by the cloud gaming system ahead of time or in the background during a game play session initiated by a primary client device, in anticipation that a specific one of the secondary client devices may be selected for a device handover by the primary client device for game play of the game during the game play session.

When a request for a device handover is received at the cloud gaming system, from the primary client device, the profiling allows the cloud gaming system to perform a faster, frictionless device handover from the primary client device to a specific secondary client device and the secondary client device will have the necessary resources (services, device attributes) to continue the game play session. In other words, profiling allows the cloud gaming system to qualify the secondary client devices, so that when a handover request is received, the system is able to switch the client device with which the user interacts with the cloud gaming site for playing the game.

A successful device change would include a server of the cloud gaming system that is executing the game, to pause game play and stop streaming of the video frames for the game to the primary client device, save a game state of the game, and provide an option for resuming the game play of the game to a secondary client device identified by the handover option. When a resume request is received from the secondary client device, the server on the cloud gaming system retrieves the game state, resumes the game play from where the game was paused, and continues streaming the video frames for the game to the secondary client device.

Discovering and profiling the secondary client devices ahead of time saves considerable wait time during device handover. The secondary client devices that are identified in the handover option are qualified to provide a comparable game play experience as that experienced when using the primary client device. Further, the profiling and provisioning ensures that the video frames are provided to the user at the secondary client device with minimal latency. Pausing the game and/or saving the game state during device handover allows for faster resumption of game play of the game.

In one embodiment, a method is provided. The method is executed by a server of a cloud gaming system and is used to identify options of secondary client devices that can be used for device handover of game play to one of the secondary client devices. The method includes establishing a session of game play of a game for a primary client device, by the server, in response to a request received from the primary client device to play the game. The server of the cloud gaming system is configured to execute the game and stream video frames to the primary client device. A request is received by the server to generate a profile of one or more secondary client devices that are identified to be local to the primary client device. The profile is configured to identify device attributes for the secondary client devices. During game play, a handover option is provided by the server to the primary client device. The handover option is configured to identify one or more of the secondary client devices for a device handover, based on their profile. A selection of a particular secondary client device identified by the handover option is received from the primary client device. The selection is configured to pause the streaming of video frames to the primary client device and save a game state for the game. The pause is configured to provide an option to resume play of the game on the particular secondary client device. A resume request is received from the particular secondary client device to continue the play of the game on the secondary client device. The resume request is configured to cause the server to access the game state for the game and to continue streaming video frames to the particular secondary client device.

In some embodiments, the request to generate a profile is received during the session.

In some embodiments, the particular secondary client device is designated as the primary client device, for the reminder of the session.

In some embodiments, the request to generate a profile is triggered in response to occurrence of a trigger event.

In some embodiments, the request to profile is received from each of the secondary client devices that are identified to be local to the primary client device.

In some embodiments, the device attributes used for qualifying the secondary client devices are ranked in accordance to requirements of the game. The secondary client devices provided in the handover option are organized in accordance to the ranking of the device attributes.

In some embodiments, the secondary client devices are identified using one or more service discovery protocols implemented within the primary client device and the secondary client devices.

In some embodiments, the request to generate the profile is received from the primary client device. The request includes device identifiers of the secondary client devices for which the profile is to be generated.

In another embodiment, a method is executed by a server of a cloud gaming system. The method is executed to identify options of secondary client devices that can be used for a device handover of game play to one of the secondary client devices. The method includes establishing a session of game play of a game for a primary client device, in response to a request from the primary client device to play the game. The server of the cloud gaming system is configured to execute the game and stream video frames to the primary client device. One or more secondary client devices are detected that are identified to be local to the primary client device. Profile is generated for the primary client device and the one or more of the secondary client devices that are identified to be local to the primary client device. The profile is configured to identify device attributes of each of the primary and the secondary client devices. A handover option is provided by the server to the primary client device during the game play. The handover option is configured to identify one or more secondary client devices that are local to the primary client device and having device attributes that are capable of enhancing game play experience for a user, based on the profiles generated for the primary and secondary client devices. A selection of a particular secondary client device identified by the handover option is received by the server from the primary client device. The selection is configured to pause the streaming video frames to the primary client device and save a game state for the game. The pause is configured to provide a resume option for resuming play of the game on the particular secondary client device identified by the handover option. A resume request is received by the server from the particular secondary client device to continue the session of game play on the secondary client device. The resume request is configured to cause the server to retrieve the game state for the game and continue streaming video frames to the particular secondary client device.

In some embodiments, the profile of the primary and the one or more secondary client devices are generated in response to a trigger event.

In some embodiments, the profile of the primary and the one or more secondary client devices are generated in response to a request from the primary client device.

In yet another embodiment, a cloud gaming system is disclosed. The cloud gaming system includes an application server that is configured to execute a plurality of games. A game execution engine in the application server receives a request to play a game from a primary client device. In response, the game execution engine executes an instance of the game and generates video frames for the game. The application server is configured to process the generated video frames, encode the video frames and stream the video frames to the primary client device. A client device profiling module within the application server is configured to receive request to generate a profile of one or more secondary client devices that are identified to be local to the primary client device, wherein the one or more secondary client devices are identified based on the profile of the primary client device. The client device profiling module is further configured to generate a list of the secondary client devices. A handover manager within the application server is configured to obtain the list of secondary client devices, qualify the secondary client devices for playing the game, and forward a refined list of qualified secondary client devices with a handover option to the primary client device. The handover manager is further configured to receive a selection of a particular secondary client device identified by the handover option and, in response, forward a signal to the game execution engine to pause the streaming of the video frames to the primary client device. In some embodiments, in response to the pause signal, a game state of the game is also saved. When the handover manager receives a resume request from the particular secondary client device, the handover manager, in response, signals the game execution engine to resume game play and continue streaming the video frames to the particular secondary client device. In the embodiments wherein the game state of the game is saved, the game execution engine, in response to the resume request, may retrieve the game state of the game and resume game play of the game from a point where it was paused, as indicated by the game state of the game.

In some embodiments, the handover manager is configured to signal a pause manager to pause the game play of the game, in response to receiving a selection of the particular secondary client device identified by a handover option. The pause manager is configured to forward a signal to the game execution engine to pause the game play of the game.

In some embodiments, the handover manager is configured to signal an operating system of the application server to pause transmitting video frames of the game to the particular primary client device, in response to selection of the particular secondary client device identified by a handover option.

In some embodiments, the handover manager is configured to signal a resume manager to resume the game play of the game, in response to receiving a resume request from the particular secondary client device. The resume manager is configured to forward a signal to the game execution engine requesting the game execution engine to retrieve game state of the game and to resume streaming video frames of the game to the particular secondary client device.

In some embodiments, the handover manager is configured to signal a resume manager to resume game play. The resume manager receives the signal and, in turn, signals the operating system of the application server to resume transmitting video frames of the game to the particular secondary client device, in response to receiving a resume request from the particular secondary client device.

In some embodiments, the handover manager is further configured to designate the particular secondary client device as the primary client device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 6A illustrates an example profile generated for the secondary client devices that are local to a primary client device, in accordance with an alternate embodiment of the invention.

FIGS. 6B, 6C-1 and 6C-2 illustrate examples of handover logic at the primary client device that provides input to select a secondary client device for device handover, in accordance with an embodiment of the invention.

DETAILED DESCRIPTION

Figure 1:
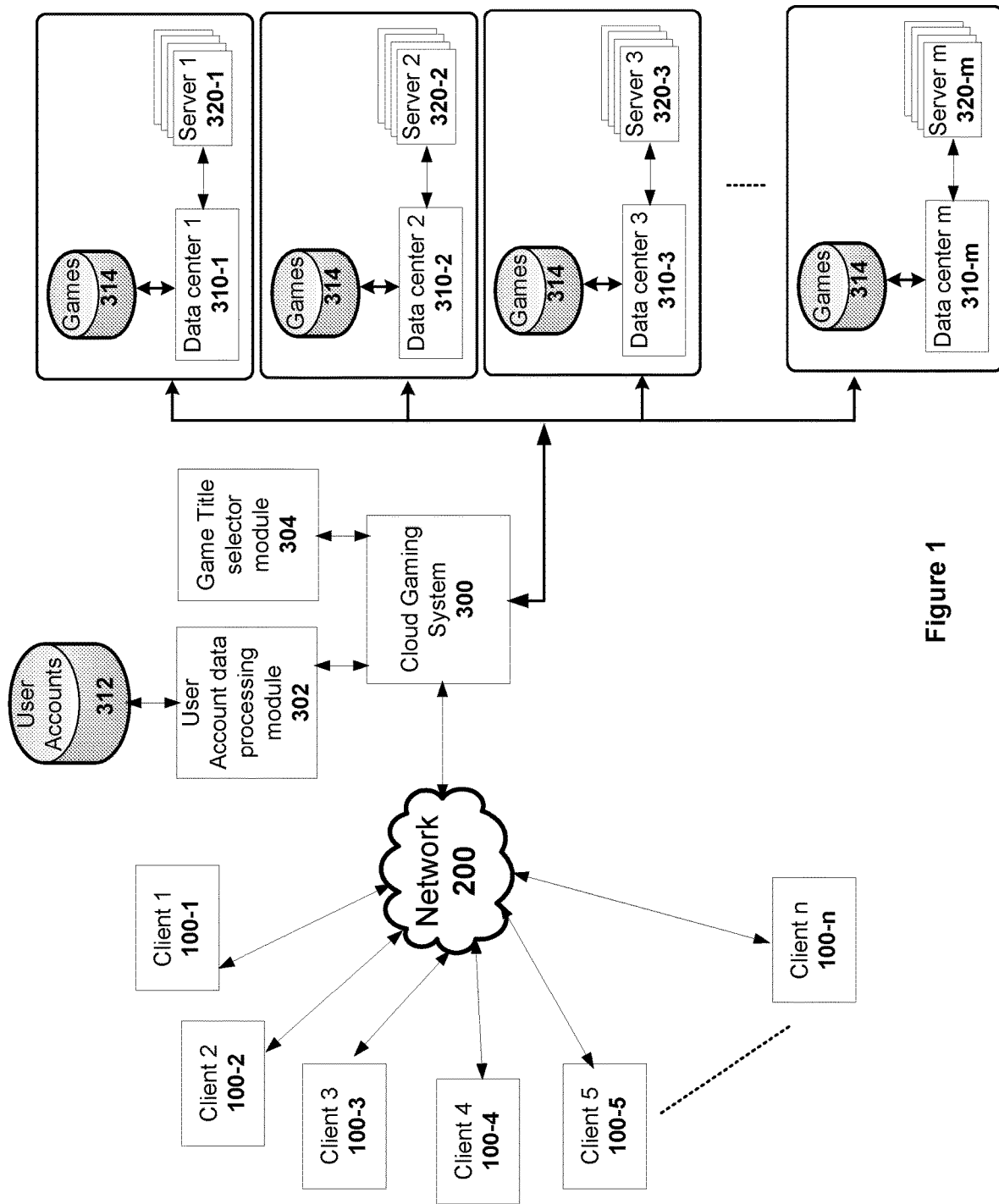
FIG. 1 illustrates a simplified block diagram of an example system that is used to identify options of secondary client device for device handover of game play of a game, in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various embodiments of the present invention, a user may access a cloud gaming system through a user account, using a primary client device, for selecting a game for game play. The cloud gaming system is configured to host a plurality of online games for game play using resources available to the cloud gaming system. In response to the user accessing the cloud gaming system, the cloud gaming system authenticates the user account using user account information stored in a user accounts database and provides a list of games that are available for the user account for game play. The user selection of a game for game play triggers the cloud gaming system to identify a data center that is in the vicinity of a geo location of the primary client device and send a request to a server in the data center to execute an instance of the game and establish a game play session. The server provides the necessary resources (i.e., processing and communication resources) for executing the game, encode video frames of the game and begin streaming the encoded video frames of the game to the primary client device for rendering and user interaction. User interactions provided at the primary client device are used to influence game outcome of the game executing on the cloud gaming system. In some embodiments, soon after initiating the game play session with the primary client device, a server of the cloud gaming system may generate a profile of the primary client device. The profiling of the primary client device may be initiated as part of quality of service (QOS) verification to ensure that bandwidth, latency, and other resource variables of the primary client device are sufficient, as part of data center selection and qualification, so that the primary client device can receive and process the streaming video frames of the game streamed from the server of the data center. It should be noted that the various embodiments discussed herein may also be extended to generation of audio frames, encoding of audio frames, streaming of encoded audio frames for the game to the primary client device for rendering.

During game play of the game, the primary client device may actively seek and discover secondary client devices that are local to the primary client device and send a signal to each of the secondary client devices or to select ones of the secondary client devices with a request to get profiled by a server of the cloud gaming system. The profile may be used to qualify the secondary client devices for playing the game. The request generated by the primary client device identifies the server that the secondary client devices have to use to get profiled. The server selected for profiling may be the server in the data center that is executing the game or may be any other server within the same data center or in any other data center within the cloud gaming system that is configured for performing such profiling. The server of the cloud gaming system that is used for profiling includes profile generation logic to generate a profile of each client device, when requested. In some embodiments, as and when the primary client device discovers a secondary client device, the discovered secondary client device is profiled. A handover option is provided at the primary client device, wherein the handover option identifies one or more of the secondary client devices that are eligible for a device handover, based on the generated profiles of the secondary client devices. In some embodiments, the handover option may be provided for handing over the streaming of only the video frames, only the audio frames or both the audio and video frames of the game. When a user selects a particular secondary client device, the user selection is forwarded to the server, which generates a pause signal. The server in the data center, in response to receiving the pause signal, pauses the game play of the game, and provides a resume option to the particular secondary client device to resume the game play.

As part of processing the pause signal, the server executing the game at the data center, in some embodiments, may initiate an event trigger that causes the server to save system state at the time when the event trigger was initiated. In such embodiments, the system preserves all application (including game application) and/or system state without directly manipulating any game attributes or game variables. The system state could be used to re-create the game state of the game. In some embodiments, the system state may be saved using an application programming interface (API). In alternate embodiments, the server, in response to the pause signal, may write out save data of the game at the time the pause signal was received. The save data records progress made by the user during game play, which could then be used to re-create a current game state of the game, when the game is resumed. For more information on how progression of a user in the game is used to recreate the game state of the game, in one embodiment, reference can be made to U.S. application Ser. No. 12/917,388, filed on Nov. 1, 2010, and titled, "USER INTERFACE, SYSTEM AND METHOD FOR CONTROLLING A VIDEO STREAM," which is incorporated herein by reference in its entirety.

In some embodiments, the user selection of a particular secondary client device indicates that the user is no longer providing game play interactions for the game from the primary client device. In some embodiments, the user selection of a particular secondary client device may indicate that the user no longer wishes to receive at least a portion of streaming game content (i.e., either audio or video frames of game content) at the primary client device. For example, the user may not wish to receive audio portion of the game content at the primary client device while still interested in receiving video portion of the game content at the primary client device. This may be the case if the audio reception at the primary client device is not at an acceptable level, for example. In such embodiments, the audio portion of the game content may be extracted and forwarded to the particular secondary client device while the video portion of the game content (with audio portion muted, for example) may continue to be streamed to the primary client device. The handover option, in such embodiments, provided at the primary client device may include options to select appropriate portion of the streaming game content (e.g., video portion, audio portion, etc.) and the particular secondary client device for streaming the selected portion of the game content as part of the device handover, so that the selected portion of the streaming game content (either the audio or the video frames) is redirected to the particular secondary client device.

In some embodiments, in response to receiving the pause signal, the server in the data center may pause the transmission of the streaming video frames and/or streaming audio frames for the game to the primary client device. As a result, the game appears to be in a "suspended" state. In this embodiment, the game may continue to be active but may not be receiving any user interactions till device handover has completed.

Selection of resume option at the particular secondary client device is forwarded to the server, leading to the server accessing the game state of the game (if any) and/or resuming game play of the game from a point where it was paused. The resumed game play causes the video frames and/or audio frames of the game to be streamed to the particular secondary client device. Alternately, where the transmission of the video frames and/or audio frames was paused while the game was kept active, the resume request would cause the server to resume transmission of the streaming video frames and/or streaming audio frames of the game to the particular secondary client device. In some embodiments, the video frames and/or audio frames are generated and streamed based on user interactions received from the particular secondary client device. In embodiments where a portion of the game content is to be streamed to the primary client device and the remaining portion is to be streamed to the secondary client device, the video and/or audio frames are generated and streamed to appropriate client devices (i.e., primary and secondary client devices) based on user interactions received from the particular secondary client device, the primary client device or from both the primary and secondary client devices.

The secondary client devices identified in the list have the device attributes that are required for game play of the game and, in some embodiments, are available for game play during a time when a handover option is received. The various embodiments discussed herein provide a user with options of secondary client devices to switch to for playing the game, during a game play session, and such switch is done in a seamless and frictionless manner. The secondary client devices that are identified in the options may be discovered using any one of a plurality of device discovery protocols that are implemented in the client devices, based on signals generated by the secondary client devices, based on other devices receiving signals from the secondary client devices, etc. The discovered client devices are profiled in the background and are qualified for game play of a game so that a device handover can be successfully effectuated.

The information provide in the profiles of the secondary client devices may be used to not only determine device attributes that are required for game play of a game but also device attributes that are either not available at the one or more secondary client devices or are not at a level that is required for game play of the game. Based on this profile information, the cloud gaming system, in some embodiments, may provision services and/or device attributes for one or more of the secondary client devices and get them ready for game play so that when a user of a primary client device selects a handover option, the switching of the client device is done in a fast and frictionless manner. In some embodiments, device profiling may be initiated in response to occurrence of a trigger event, such as a user action, a calendar event, a signal from a primary client device (e.g., low power signal, etc.), a social media event, in response to a change in one or more device attributes of the primary client device, etc.

The secondary client devices may be part of a same network as the primary client device, Once the secondary client devices have been discovered, the primary client device may prompt each of the discovered secondary client devices to get profiled, by sending a signal, to initiate a connection with a server, such as an application server in the cloud gaming site, and exchange information with the server. In other embodiments, once the secondary client devices are discovered, the primary client device may prompt a server of the cloud gaming system to profile the one or more secondary client devices, by sending a signal to initiate a connection with each of the discovered secondary client devices and exchange information with the secondary client devices. The information that may be exchanged between the secondary client devices and the server include, for example, session information, quality of service information, device capabilities, game being played or available for playing, video codec information, audio codec information (where available), speaker configuration, device availability, hardware attributes, software attributes, etc.

Since each game may have different resource requirements, the device attributes that are needed for initiating the streaming session for each game may be different. As a result, the information provided in the profile may be used to evaluate the device capabilities of each of the discovered secondary client devices to determine if the respective one of the secondary client devices has sufficient device attributes that are needed for initiating a streaming session for a game. For example, as part of the evaluation, the network bandwidth of each secondary client device may be monitored continuously, periodically, or at pre-defined times. The results from such monitoring may be used to update the profiles of the respective secondary client devices so as to maintain current device attributes of the secondary client devices. Further, each of the primary and secondary client devices may have different types of inputs to provide game interactions. For example, client device A may use a game pad, client B may use a touch screen while client C may use a keyboard for providing the game interactions for a game that is set up to receive user interactions from such inputs. As a result, the information provided in the profile of the discovered secondary client devices, in some embodiments, may be used to identify the types of inputs that are used by each client device to provide the input for the game so that when a device handover occurs, an adjustment to the input method is made. For example, the primary client device may be using a touch screen input and the selected secondary client device may be using a game pad, both of the input methods being acceptable for receiving interactions for the game. When the device handover occurs, switching of the client device from the primary client device to the selected secondary client device would cause the game to recognize differences in the input methods between the two client devices (i.e., primary client device and the selected secondary client device) and switch the input method for receiving game interactions for the game from the touch screen input to the game pad input, for example. In some embodiments, the game may not recognize the input method used by the selected secondary client device. In such embodiments, either the cloud gaming system or the selected secondary client device may offer input emulation, (e.g., an onscreen virtual input method such as a virtual game pad or virtual keyboard, virtual number pad, virtual game controls, etc.), at a display portion of the secondary client device and the type of input emulation that is selected for presentation may be based on the type of client device. Similarly, each client device has its own resource capabilities and limitations (e.g., screen/display resolution, aspect ratio, audio capabilities, etc.), and these are reflected in the profile information of the respective client devices. The information provided in the device profile may be used to qualify the client devices, define input methods for the game, and/or adjust the streaming video frames.

Based on the devices profiles of the secondary client devices, a user of the primary client device may decide to initiate a device handover to a specific one of the discovered secondary client devices. The decision to initiate the device handover may be based on the determination that a secondary client device has device attributes, such as higher resolution, higher frame rate, lower latency, etc., that may provide a better game playing experience to the user. Alternately, the decision to initiate the device handover may be based on the fact that the primary client device is no longer able to support the game play of the game, due to lack of power in the primary client device, or non-availability of one or more device attributes, etc.

As part of device handover, a device handover option along with a list of one or more of the secondary client devices that are pre-qualified to provide alternate, comparable or better game play experience, is provided for user selection at the primary client device. User selection either at the handover option or at a particular secondary client device from the list, triggers the device handover. As the server has already pre-qualified the secondary client devices that are included in the list, the user selection would result in a faster, efficient, frictionless and seamless device switch so that the server may continue streaming the video frames for the game to the selected secondary client device. In some embodiments, in addition to switching streaming of video frames and/or audio frames from the primary client device to the selected secondary client device, the switching may also include switching of one or more controllers that are used for providing input to the game. Oftentimes, a user may use a wireless controller (e.g., Bluetooth based, or other wireless-technology based) that is associated with the primary client device to interact with the game. In such embodiments, when a device handover is triggered, the switching may also include a handover of the Bluetooth connection of the wireless controller from the primary client device to the selected secondary client device. As part of the device hand over, the primary client device may notify the secondary client device attributes of the wireless controller that is used for providing input to the game. In addition to notifying the secondary client device, the primary client device may disconnect the wireless controller. The selected secondary client device receives the notification, and may proceed to automatically discover the wireless controller using the device attributes of the wireless controller and form an association with the wireless controller so that the selected secondary client device may provide input using the newly associated wireless controller. In alternate embodiment, a wireless controller with similar device attributes may already be associated with the selected secondary client device. In such embodiment, the secondary client device may not go through the discovery process for discovering the wireless controller or through the association process to associate the wireless controller with the primary client device. Instead, the wireless controller that is already associated with the selected secondary client device may be used for providing input to the game once it is determined that the wireless controller has necessary device attributes for providing input to the game and the game will receive and map the inputs received from the wireless controller to update game state of the game.

The device discovery may, in some embodiments, be initiated by the primary client device when the primary client device is idle, or may be initiated during a game play session or periodically or when running a different application. The profiling of the secondary client devices are performed in background to obtain the quality of service and other state of the secondary client devices so that when and if the user decides to change devices for game play, the device switch occurs effortlessly as the device attributes, device settings are pre-established for a quick stream switch. With the general understanding of the invention, specific embodiments will now be described with reference to the various drawings.

FIG. 1 illustrates a simplified block diagram of a system used for identifying options of secondary client devices that can be used for device handover of game play, in one embodiment of the invention. The system includes a plurality of client devices 100-1 through 100-$n$ that are communicatively connected to a server (320), such as an application server, of a data center 310 via a user account of a cloud gaming system 300. The server 320 is accessed by the client device 100 over a network 200, such as the Internet.

A client device 100 (i.e., any one of 100-1 through 100-$n$) is any computing device that includes a processor, a memory, network connections to connect to the network 200, appropriate APIs to communicate with a server-side application, and one or more decoders to decode content provided by the server-side application, such as a game application. The processor is capable of executing a client-side application that may interact with a server-side application by connecting to the network through the network connections and use application programming interfaces (APIs) to communicate with or access the server-side application. The network connection can be a wired or wireless connection. The client device 100 may be a thin client, a general purpose computer, a special purpose computer, a game console, a personal computer, a lap top computer, a tablet computing device, a mobile computing device, a portable gaming device, a cellular phone, a smartphone, a head mounted display, a smart wearable device, a set-top box, a streaming media interface/device, a smart television or networked display, or any other computing device that can be used to access an application available on a remote server. The network connections and communication protocol available at the client device 100 enable the client device 100 to communicate with the remote server to receive content, including streaming video frames of multimedia content, from the remote server, such as a server that is part of the cloud gaming system 300. The video frames representing game play content streamed by the remote server have undergone compression using an encoder at the remote server before the video frames are streamed to the client device. The client device 100 may include a decoder to decompress the streaming video frames and render content using respective component of the client device 100.

In some embodiments, the amount of processing performed by the client device 100 may vary with respect to input and output processing. Broadly speaking, a game or an application is substantially maintained, executed and compressed/encoded on a game server or other application server 320 available within a data center 310, with the client device 100 primarily functioning to receive, decode, process and render audio/video data on a display of the client device 100. The client device 100 is further configured to communicate user inputs back to the game server or other application server. The client device 100 may be a standalone computing device that is connected to a display for rendering video data. In other embodiments, the display can be integrated into the client device 100. In one embodiment, the display is a networked display device providing a platform operating system for applications or "apps" utilizing the network connectivity of the display device. In such an embodiment, the client device 100 can be defined by an application executed on the platform provided by the display device's operating system.

During game play session, the client devices 100-1 through 100-$n$ may actively seek one or more other client devices that are local to it. The client device 100 that is used to initiate a game play request is referred to herein as a "primary" client device and the client devices that are local to the primary client device and discovered for device handover are referred to as "secondary" client devices. Depending on the location of the primary client device 100, the secondary client devices that are detected to be local to the primary client device may vary. For example, the secondary client devices that are identified to be local to a primary client device 100 in a user's home network may be different from the secondary client devices that are identified in a user friend's home network, which may be different from the secondary client devices that are identified in an office environment, etc.

A server as used in this application may be a remote server, a virtual computer, a cloud gaming server, a cloud application server, a remote application server, a digital media server, a server that is used to provide a storefront of a game developer/game sponsor, a webserver, a terminal server, a console server, or any other type or form of server computing device available in a data center that is capable of hosting one or more games or applications (including providing or allocating processing resources for executing the games or applications) that users can access and interact during cloud gaming. The server may include an encoder to compress the data in the video frames and forward the compressed video frames in a data stream to the client device 100 using application programming interface (API) calls that follow specific type of protocol.

For example, a server 320, such as a cloud gaming server in a data center 310, executes a video game that is selected for game play by a user, defines a state of the video game from moment to moment, and sends streaming video frames (including image, video and audio data) to a primary client device 100 from where the request for game play of the game was initiated. A user input module 107 of the primary client device 100, in turn, is configured to process user input from a user playing the video game, and transmit the input data to the server 320. The server 320 is configured to process the input data to affect the game state of the video game.

The cloud gaming system includes a plurality of data centers 310-1 through 310-$m$. A data center 310, in one embodiment, may include a plurality of servers 320 (e.g., gaming servers), storage systems that are capable of storing game codes, application codes, user-related and application-related data stores and make them readily available to enable handling of varied requests from a plurality of users. The data center may also include telecommunication equipment, such as routers, switches, etc., to establish communication connection between the client devices 100 and the plurality of servers 320. Each of the plurality of servers 320 may be equipped with server-side APIs (either distinct or similar) to communicate with the corresponding client-side API at a client device 100 or with server-side APIs associated with third party social media providers. In some embodiments, the servers 320 in the data center 310 may be configured to execute various types of applications, including gaming applications, and stream the application content (i.e., video frames generated by the game application) to corresponding client devices 100 for rendering. The servers 320 may be configured to perform operations of compression on any data generated or provided by the servers 320 using any number of compression techniques and forward the compressed data to the client devices 100 using any one of the communication and/or transmission protocols. The servers may include terminal servers, console servers, virtual servers, etc., that are typically used to perform or execute specific functions, games or applications. Some examples of functions, games or applications performed by the servers may include database management, file management, mail service, print service, web service, game management, application management, media management, catalog service, communications management, computing service, and proxy management, to name a few. In some embodiments, the servers 320, such as console servers, may emulate a game console by executing a game and providing streaming video frames to the one or more client devices 100 for rendering. In some embodiments, a plurality of servers and/or storage devices may be provided as rack-mounted servers or storage devices, with each data center containing rows of server and/or storage racks. Each server may be capable of executing a plurality of applications and/or provide a wide range of services.

The server 320 may also include a device profiler that may be engaged to profile a client device. The device profiler may be configured to establish a communication connection with one or more client devices to exchange information with the client devices. The information exchanged is used to identify the device attributes and to generate a profile of each client device.

It should be appreciated that the cloud gaming system 300 facilitates single-player or multi-player cloud-based gaming from players located at different geo locations by allowing instances of one or more video games to be executed by one or more servers 320 (e.g., application or game servers) within one or more data centers, which can be accessed by the players over the network 200. In this manner, execution of the video game is not dependent on any single player's hardware or network conductivity, though such will affect the user experience for that given player.

The operations performed using cloud gaming architecture described herein form technical operations requiring multiple servers and/or execution platforms to enable quick access to databases and presentation of content, such as game play content, to remotely located client devices 100 of users. Cloud gaming can also include the operations of compression performed by the cloud gaming servers utilizing any number of compression techniques. The compression techniques may use standard encoders, which would then allow the standard decoders on client devices 100 to access and decode the data. In some embodiments, specialized encoders and decoders may also be implemented in the server and client device, respectively, to allow specialized encoding and decoding. The decoded data may be further processed in the client device to identify image, video and audio data, which are then presented using appropriate device components on the client devices 100, so as to enable game play of the video games.

The management of the video games and distribution can include a number of data centers, direction servers, quality-of-service testers or engines, direction and redirection to lower latency data centers. It should also be understood that these operations and tasks will utilize special purpose server computers that are designed for streaming and low latency due to the remote execution of games, and the delivery of streaming game or application data to the client devices 100.

When a request to access the cloud gaming system 300 is received from a primary client device 100, a server on an application hosting system, such as a cloud gaming system 300, interacts with user account data processing module 302 to obtain user-related information. The user account data processing module 302 queries and receives user account information from a user account database 312, where user profile and other user account information are stored. The user profile and user account information are used to identify a user associated with the primary client device 100 from which the request is initiated, and to authenticate the user, request. Upon user authentication, the client request is serviced by the server associated with the cloud gaming system 300. In one embodiment, the server of the cloud gaming system 300 may determine all the games and/or applications that are available for the user account, including games/applications that were purchased, games/applications that a user of the user account is authorized to view, play, all the games and/or applications that are available for free. A game title selector module 304 retrieves the game titles for the user account and returns the game titles in a list for presenting on a user interface at a display of the primary client device 100. In one embodiment, user selection of any one of the game titles rendered on the client device, is detected and a signal is sent from the primary client device 100 to the server of the cloud gaming system 300 informing the server of the user-selection of a game title.

The cloud gaming system 300 hosts a plurality of applications, including game applications. In response to receiving the user selection of a game title, the server of the cloud gaming system 300 may identify a data center 310 to service the request of game play of the selected game title and forward the request to the data center 310 for servicing the request. The data center 310 may be selected based on a geo location of the primary client device 100, for example. Selecting a data center 310 to service the request based on geo location may have its own disadvantages. For example, the data center 310 at the geo location may experience network congestion due to high demand on its resources. Alternately, the data center 310 at the geo location may not be able to service the request for game play from a particular primary client device due to lack of peer-to-peer agreements between the network provider that services the primary client device and the network provider that is associated with the operation of the data center. The aforementioned disadvantages are just examples and that other disadvantages may also exist. To overcome such disadvantages, in another example, the data center 310 may be selected based on the results of network performance tests, such as bandwidth/latency tests, etc. For example, when a primary client device is used to initiate a game title selection for game play, the server of the cloud gaming system 300 may determine a geo location associated with the primary client device and identify one or more data centers 310 to service the request. When assigning a data center, the cloud gaming system 300 may realize that servers within a data center 310 that is in the geo location of the primary client device may not have sufficient resources to service the request. As a result, the cloud gaming system 300 may identify a data center 310 that is outside the geo location in which the primary client device is based, to service the request. The data center outside the geo location may be identified over other data centers in the geo location associated with primary client device, based on the bandwidth test, for example.

As mentioned earlier, the data center 310 may include a plurality of servers 320, with each server 320 executing or set up to execute one or more game titles that are available at the data center 310. A game title data store 314 in each data center 310 provides the list of game titles that are available at the data center 310 and the necessary game code for executing the games identified by the game titles, at one or more servers 320 in the data center 310.

A server 320 in a data center 310 that is identified for servicing the game play request of a game establishes a game play session by executing an instance of the game, generates video frames for the game, and streams the video frames to the primary client device 100 for rendering. The server receives user interactions provided at the primary client device 100 and uses it to affect an outcome of the game and to update the game state. The client device may be used to identify other client devices that are local to it. The identified other client devices are provided as options for a device handover.

Figure 2:
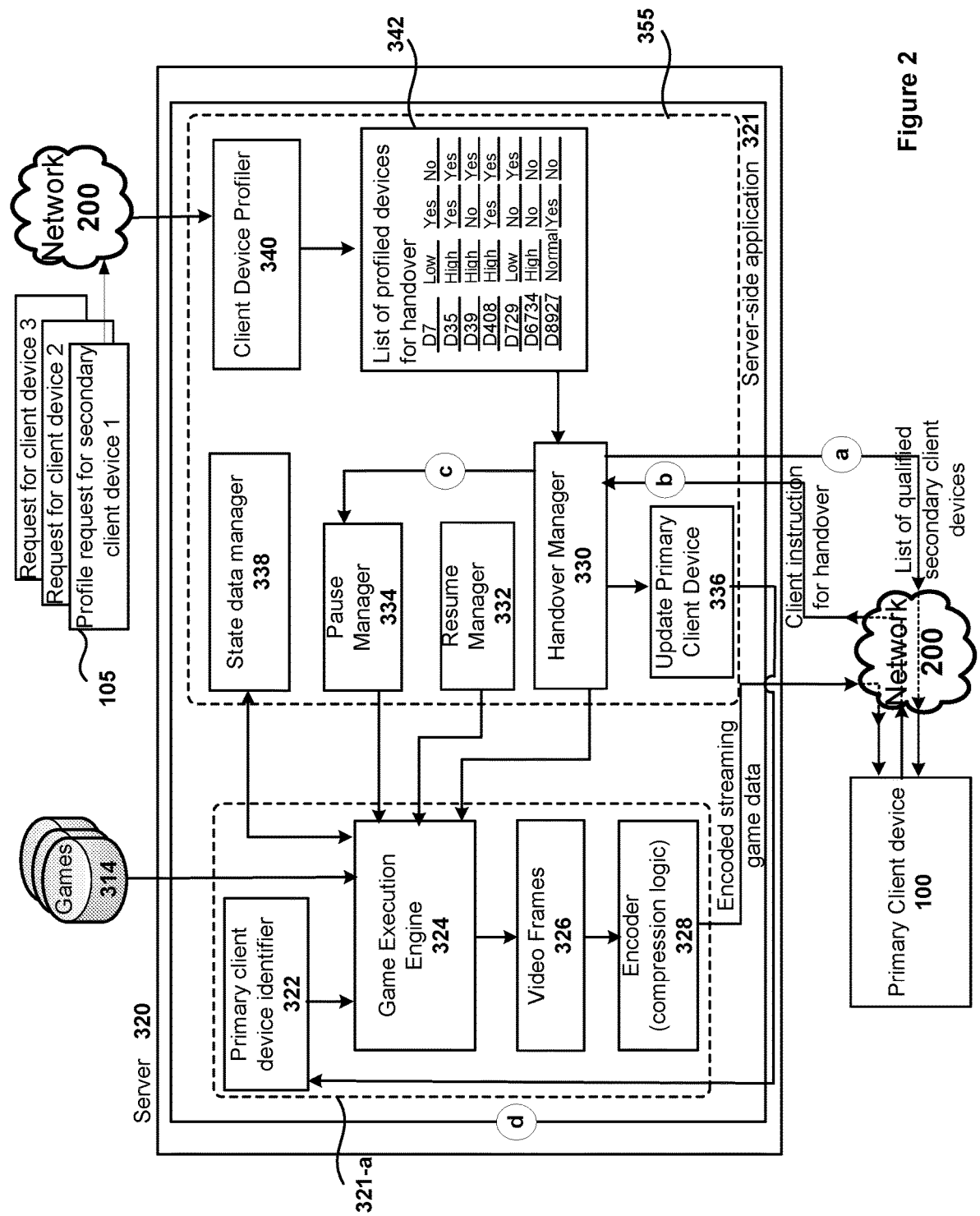
FIG. 2 illustrates an example application server with various modules that are used for generating a handover option identifying one or more secondary client devices for device handover, in accordance to an embodiment of the present invention.

FIG. 2 illustrates the various modules of a server-side application 321 executing on a server 320 within a data center 310 of a cloud gaming system 300 that is used to identify options of secondary client devices for a device handover during game play, in one embodiment. The server-side application 321, in one embodiment illustrated in FIG. 2, may include modules of a game application 321-a integrated with modules of a handover application module 355. The modules of the game application 321-a, are used to execute the game and provide streaming video frames of the game during game play to a client device, such as a primary client device 100, in some embodiments. In such embodiments, the video frames are encoded prior to transmitting the same to the primary client device. In some embodiments, application programming interfaces (APIs) that are part of the game application may be used for transmitting the video frames. The APIs may include the logic to capture the video frames generated by the game application, and use encoding technology available within to encode the video frames and transmit the encoded video frames to a client device, such as a primary client device 100. It should be noted that the various embodiments discussed herein for processing the video frames may also be extended to processing of the audio frames.

In some embodiments, the encoding of the video frames may be based on 'regions of interest' provided by the game. Usually, when a frame of game data is to be encoded, the encoder has to adhere to a 'bits budget'. Bits budget defines how bits are to be used for encoding the frame so as to provide optimal data content. Relying on the bits budget, the encoder attempts to assign more bits to certain areas of the frame (e.g., areas of the frame that have dense content) while assigning less bits to other areas of the frame (e.g., areas that have less content). In order to assist the encoder to optimally encode the video frames, the game provides information related to the regions of interest so that the encoder can identify areas that deserve more detail (i.e., areas with text, intense game scene, such as grass, leaves, forests, etc., intense actions, etc.) and areas that deserve less detail (i.e., less noticeable areas of the frame). Equipped with this level of detail from the game and the bits budget, the encoder assigns the bits for the video frame, so as to provide optimal frame content for viewing.

In alternate embodiments, the streaming video frames of the game generated during game play are forwarded to an operating system of the server 320 or to graphical processing unit (GPU) drivers that interface with the game application 321-a and/or the operating system. The GPUs may process the video frames and provide it to the operating system of the server 320. The operating system of the server 320 may receive the processed video frames and, in the background, perform some form of encoding before transmitting to the primary client device 100. In some embodiments, the operating system of the server 320 within the cloud gaming system 300 may engage an encoder available within the cloud gaming system 300 to perform the encoding of the video frames prior to transmitting the same to the primary client device 100 for rendering. As in the previous embodiments, the encoder may receive detailed information related to regions of interest from the game and encode the video frames by assigning the bits of data that make up the video frames in accordance to the detailed information. The embodiments discussed herein with reference to processing of video frames may also be extended to the audio frames. The operating system may monitor the network conditions and responsively adjust the frame rate, bit rate, etc., of the video frames and/or the audio frames prior to forwarding the video frames and/or audio frames to the client device.

In alternate embodiments, an external application that is outside of the cloud gaming system 300 may capture High-Definition Multimedia Interface (HDMI) video signals representing the streaming video frames that are being transmitted by the operating system of the cloud gaming system 300, and may engage an external encoder to encode the video signals. The external application then handles the transmission of the encoded video signals to the client device. As part of transmission, the external application may monitor the network conditions and adjust the quality (i.e., frame rate, bit rate, etc.) of the video frames that is streamed to the primary client device 100.

In some embodiments, based on the network conditions, the operating system or the external application may automatically trigger a device handover. As part of the triggering, the operating system or the external application may discover other secondary client devices that are in the vicinity of the primary client device, signal the discovered secondary client devices to get profiled by the server, and forward the secondary client device information to the handover application module 355 for use during a device handover.

The modules of the handover application module 355 are used to identify secondary client devices that are local to the primary client device, or use the secondary client device information provided by the operating system or an external application, profile the secondary client devices and provide them as options for a device handover. In other embodiments, the server-side application 321 may include a game application 321-a that is separate from the handover application module 355. In such embodiments, the game application 321-a and the handover application module 355 may be separately executed on the same server or the game application 321-a may be executed on a first server and the handover application module 355 may be executed on a second server in the data center, with the first server and the second server in communication connection with one another to exchange data, such as user selection, game state, pause/resume requests, etc. In some embodiments, the game application 321-a that is generating the streaming video frames and/or audio frames may have the capability to monitor the network connection to the primary client device and share this information with the handover application module 355. Alternately, the network connection quality information may be provided to the handover application module 355 by the operating system of the server or an external application.

The handover application module 355 may use the network connection information of the primary client device and the profiles generated for the secondary client devices to determine if one or more secondary client devices that are local to the primary client device have better network connection quality than what is available at the primary client device. When the handover application module 355 identifies one or more secondary client devices, the handover application module 355 may generate an informational message with an option to switch to alternate secondary client devices for improving game play experience. The informational message along with a list of alternate secondary client devices may be forwarded to the primary client device for rendering on the client-side for user selection, during a device handover. In some embodiments, the informational message may be provided as an overlay for rendering on top of game scene that is rendering on a display portion of the primary client device. Alternately, the informational message may be rendered server side by the game application 321-*a* or by a server side process, or by a user interface of the server side game console, etc. In some embodiments, the user interface of the server side game console is hidden but renders notifications in response to trigger actions, such as receiving a new email, receiving a new message, detecting a user or a friend of a user coming online, etc., wherein the trigger actions may be extended to also include receiving informational message.

The function or role of the various modules will be explained with reference to the integrated server-side application model illustrated in FIG. 2 but can be extended to other server-side application model discussed above. As mentioned earlier, the server-side application 321 includes modules of the game application 321-*a* integrated with modules of a handover application module 355. The plurality of modules of game application 321-*a* enables the server 320 to identify device identifier of a primary client device 100, identify and execute an instance of a game requested by the primary client device 100, and to provide streaming video frames for forwarding to the primary client device for rendering. The plurality of modules of the handover application module 355 enables the server to discover and qualify one or more secondary client devices and to provide a list of qualified secondary client devices as options for a device handover.

Some of the modules within the game application 321-*a* portion of the server-side application 321 that are used to provide game related data to a client device 100 include a primary client device identifier 322, a game execution engine 324, and an encoder 328, to name a few. The modules in the handover application module 355 include modules for effectuating a device handover and modules for profiling one or more secondary client devices. The modules for effectuating device handover include a handover manager 330, a resume manager 332, and a pause manager 334, to name a few. The module for profiling one or more secondary client devices includes a client device profiler 340.

In response to a user selection of a particular game title for game play, the cloud gaming system 300 identifies a data center 310 that is in or proximal to a geo location of the primary client device, and is configured to service the game play request. The cloud gaming system 300 forwards the game play request to a server at the identified data center, which identifies the game title from the game title data store 314 that is within the identified data center.

As part of servicing the request, the server 320 identifies the client device 100 that initiated the game play request using a primary client device identifier 322 and designates the client device 100 as a primary client device 100. The identity of the primary client device 100 is used for forwarding the streaming content. The server 320 then establishes a game play session by providing necessary resources for game execution (e.g., storage, processor, etc.) and directing a game execution engine 324 of the game application 321-*a* to retrieve the game code of the game and instantiate the game by executing the game code for the game on the server 320. As part of instantiating the game, the game execution engine 324 generates video frames 326 for the game. The video frames 326 are compressed in accordance to a communication protocol defined for the primary client device 100, using an encoder 328. The encoded game data is streamed to the primary client device 100 for rendering. In some embodiments, the encoder 328 may be part of the game application 321-*a*. An Application Programming Interface (API) of the game application 321-*a* is used to stream the encoded video frames to the primary client device 100. In some embodiments, the APIs that are part of the game application 321-*a* may include encoding logic to encode the video frames and forward the encoded video frames to the primary client device. In alternate embodiments, the video frames generated at the game execution engine 324 are captured by an operating system of the server 320 and processed. As noted previously, in some instances, the operating system may encode the video frames, monitor the network conditions and adjust quality of the video frames before the encoded video frames are streamed to the primary client device 100. Alternately, the operating system may process the video frames and forward the same as HDMI video signals. An external application that is outside of the cloud gaming system may capture the HDMI video signals, encode the video frames captured in the HDMI video signals using an external encoder, monitor the network conditions and adjust the resolution of the images in the video frames and/or transmission rate prior to transmitting the video frames to the primary client device 100 through one or more APIs available within the external application. It should be noted that the process used for capturing, monitoring network conditions, encoding and transmitting the video frames may be extended to audio data, as well. User interaction at the primary client device 100 is received by the server and used to adjust game outcome at the game execution engine 324.

During the game play session, the primary client device 100 may actively seek out other client devices (also referred to herein as secondary client devices) that are identified to be local to the primary client device 100. In one embodiment, upon detecting a secondary client device, the primary client device 100 may establish a network connection with the secondary client device and send a signal to the secondary client device to communicate with the server 320 and get profiled. It may be advantageous to have the secondary client device establish the network connection as opposed to the server 320 due to presence of security devices, such as firewalls, at the server 320. Establishing a network connection through the secondary client device may be enabled through one or more background agents that are available on secondary client devices. For example, usually the secondary client device is always connected to a social media server, an email server, etc., and receives a social media notification or email notification, etc. The primary client device may access the secondary client device via this network connection and send a signal to the secondary client device to profile itself. The signal may include a link to the server, an IP address of the server, etc., to enable the secondary client device to identify and establish a communication link with the appropriate server in order to initiate a profile request 105. In alternate embodiment, upon detecting the secondary client device, the primary client device 100 may send a signal with a profile request 105 to the server 320 requesting the server to establish a communication link with the secondary client device and generate a profile of the secondary client device detected by the primary client device. In this embodiment, the signal from the primary client device 100 may include the device identifier of the secondary client device.

The server 320, in response to the signal from the primary or the secondary client device, may establish the communication connection with the secondary client device. The communication connection allows a client device profiler 340 of the server-side application 321 to request and receive information, such as network bandwidth information, quality of service information, device capabilities including memory, processor speed, etc., device availability, game/application availability, etc., from the secondary client device. The information exchanged is used to generate a profile of the secondary client device. The profile identifies the device attributes of the secondary client device from information exchanged with the server. As additional secondary client devices are discovered by the primary client device, the additional secondary client devices are also profiled by the client device profiler 340, in response to the profile request. The profile information for the different secondary client devices is used by the client device profiler 340 to generate a list of secondary client devices 342 that can be used for device handover.

In an alternate embodiment, instead of the primary client device actively seeking secondary client devices, different components of the server may actively seek secondary client devices that are local to the primary client device that is actively involved in the game play session of a game available on the cloud gaming system. For example, the game application 321-a or an API in the game application 321-a, API within the game server that processes the video frames, or an external application within the cloud gaming system that processes the video frames may actively be involved in discovering secondary client devices for device handover. In such embodiments, the server may determine geo location of the primary client device using signals generated by the primary client device or based on information obtained from social media posts that a user interacts with using the primary client device (either before or during the gameplay session) or from tools embedded in the primary client device or from applications implemented in the primary client device, etc. Using the geo location of the primary client device, the server may seek to discover one or more secondary client devices that are identified to be local to the primary client device using one or more device discovery protocols implemented in the various client devices, for example. In some embodiments, the secondary client devices are registered with the cloud gaming system and are either actively interacting with the cloud gaming system or are dormant. In other embodiments, the secondary client devices may be actively interacting with other content provider system but may be set up for cloud gaming on the cloud gaming system.

Once the secondary client devices are identified, the client device profiler 340 may generate profiles of the primary client device and the secondary client devices and such profiling may be done automatically as and when a secondary client device is detected by the server or in response to a trigger event (e.g., low-battery power signal, increased latency, a calendar event, etc.). Profiles of the primary and the secondary client devices may be used by the client device profiler 340 to determine if any one or more of the secondary client devices has device attributes that can enhance the game play experience of the game currently being played, for the user. When it is determined from the generated device profiles that one or more secondary client devices include device attributes that can provide better game play experience (enhanced resolution, improved frame rate, lower latency, etc.) than what is being provided by the primary client device, the client device profiler 340 identifies the select ones of the secondary client devices and generates a list of secondary client devices.

The list of secondary client devices 342 is forwarded to the handover manager 330. The handover manager 330 is configured to query the game execution engine 324 to determine the device attribute requirements for the game. Each game may have its own device attribute requirements. For example, a graphic intense game may require a higher network bandwidth while a computation intense game may require a faster processor. As a result, the device attribute requirements may be specific to the game and the secondary client devices are being identified based on the device attribute requirements of the game. The handover manager 330 uses the device attribute requirements for the game to qualify the secondary client devices provided in the list 342. Additionally, in some embodiments, the handover manager 330 may identify one or more device attributes or services that need to be provisioned for a secondary client device in order for the secondary client device to be qualified for game play of the game. The handover manager 330 may then proceed to provision the required device attributes or services in order to qualify the secondary client device for game play. The list 342 is refined by the handover manager 330 to include only those secondary client devices that are qualified for game play of the game. The secondary client devices identified in the refined list may be a subset of the secondary client devices provided by the client device profiler 340.

It should be noted that the subset of qualified secondary client devices may include one secondary client device from the list 342 provided by the client device profiler 340, some of the secondary client devices from the list, or all of the secondary client devices in the list. The handover manager 330 forwards this refined list of qualified secondary client devices to the primary client device 100 with a handover option, for user selection, as shown by a directional arrow represented by bubble 'a'.

The handover option with the list of qualified secondary client devices is rendered on the display of the primary client device. In one embodiment, the list of qualified secondary client devices may be rendered as a client-side overlay style menu over the game scenes of the game and options may be provided at the primary client device for selecting any one of the qualified secondary client devices. In another embodiment, the list of qualified secondary client devices may be rendered on the server-side. In such embodiments, the list of qualified secondary client devices may be part of the video stream that is forwarded to the client device for rendering. User selection of the handover option and/or a qualified secondary client device is passed over to the handover manager 330, over the network 200, as shown by a directional arrow represented by bubble 'b'. In one embodiment, in response to receiving user selection from the primary client device, the handover manager 330 may then proceed to instruct or send a command or signal to a pause manager 334 to pause the game play of the game, as illustrated by directional arrow represented by bubble 'c'. The pause command or instruction will include the identifier of the primary client device as well as the secondary client device identified in the user selection. In response to the pause command, the pause manager 334 signals the game execution engine 324 to pause the game play. In an alternate embodiment, the handover manager 330 may send a signal directly to the game execution engine 324 to pause the game play. Irrespective of which module provides the pause signal, the game execution engine 324, in response to the pause signal, would interact with a state data manager 338 to determine a game state of the game at a time when the pause request was received, in one embodiment. The state data manager 338 is configured to analyze game play of the game to determine the game state of the game at the time the pause signal was received, and to identify a restart point from where the game play may be resumed. The game state of the game and the restart point may be maintained by the state data manager 338 for the duration of the game play session. In an alternate embodiment, the state data manager 338 may write save data of the game that includes progression made in the game during game play up till the point when the pause request was received. This save data may be used to re-create the game play of the game when the game play is resumed. Further, as part of pausing the game play, the game execution engine 324 suspends streaming video frames to the primary client device identified in the pause signal.

In addition to providing a pause signal, the handover manager 330 may provide a resume option to the secondary client device identified in the pause signal to allow the secondary client device to resume game play of the game. User selection of the resume option from the secondary client device causes a resume request signal to be forwarded from the primary client device 100 to the handover manager 330 on the server.

The handover manager 330 may verify the resume request is from the selected secondary client device. Upon verification, the handover manager 330 may forward the resume request to a resume manager 332 for processing. The resume manager 332 may interact with the game execution engine 324 to determine the game state of the game. The game execution engine 324 receives the request from the resume manager 332 and queries the state data manager 338 to obtain the game state of the game and game restart point for the game. The resume manager 332 may then instruct the game execution engine 324 to resume game play of the game and stream the video frames from a re-start point identified for the game, to the selected secondary client device. As part of resuming the game, the resume request may include capabilities of the selected secondary client device, such as screen display resolution, input controls available, audio capabilities, etc. The capabilities of the selected secondary client device provided with the resume request may be used to adjust the stream of video frames so that the video frames can be rendered on the selected secondary client device. Further, the input methods used by the secondary client device are used to adjust the game play so that the game can recognize the interactions provided using the input methods available at the secondary client device. The video frames 326 are compressed in accordance to the communication protocol that is defined for the secondary client device prior to streaming to the secondary client device. The compression technique used for compressing the stream of video frames sent to the primary client device and the secondary client device may be same or different depending on the type of the primary and secondary client devices chosen for game play.

Meanwhile, the handover manager 330 uses the secondary client device identifier that was provided in the resume request to update the primary client device that will be interacting with the game execution engine 324. The handover manager 330 instructs an update primary client device module 336, which in turn sends a signal to the primary client device identifier module 322 to update the client device identifier with the secondary client device identifier, as illustrated by bubble 'd', so that the game execution engine can identify the client device to begin streaming the encoded video frames. As part of updating, the primary client device identifier module 322 replaces the primary client device identifier with the secondary client device identifier and designates the secondary client device as the primary client device 100.

In some embodiments, the handover option may allow selection of more than one secondary client device from the list of qualified secondary client devices for device handover. In such embodiments, user selection of the resume request option from a specific secondary client device will determine which one of the secondary client devices to stream the video frames from the resumed game play. Selection of more than one secondary client device may be to provide the user additional options of different qualified devices, so that the user can select a device based on the device availability, network bandwidth, communication signal strength, available frame rate, quality of service, etc. For example, two secondary client devices may be identified to have similar device attributes but one may not be available for the entire duration of the game session from the time when a handover request is received, or may have low communication signal strength or power, etc. In such cases, providing the resume request option on both the secondary client devices may help the user in switching to the appropriate secondary client device for playing the game, during a device handover.

Figure 3:
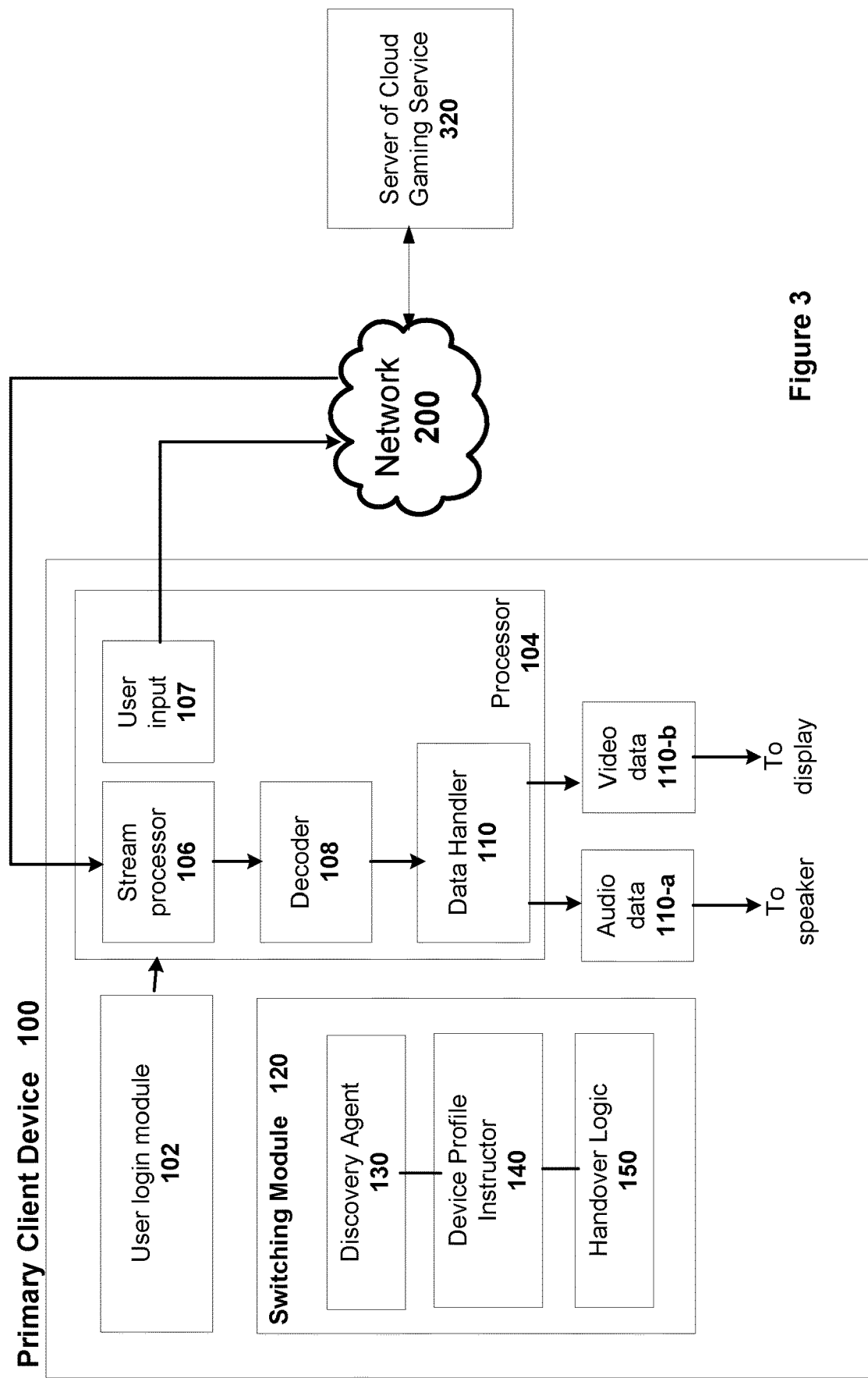
FIG. 3 illustrates a primary client device with a switching module that is used for initiating a device handover, in accordance with one embodiment of the present invention.

FIG. 3 illustrates various modules within a primary client device that may be used to identify options of secondary client devices and for selecting a secondary client device for device handover, in one embodiment of the invention. The primary client device is a computing device that includes components, such as a processor 104 for processing requests and data received from a server, such as a cloud gaming server 320, one or more memory units for storing data, network components and communication protocols for connecting to the internet, and for interacting with other devices, such as servers, consoles, other client devices, controllers, network devices, etc. The primary client device 100 may be a laptop computer, a desktop computer, a mobile phone, a tablet computer device, a head mounted display, etc. A user login module 102 is used to provide a user interface for rendering on a display of the primary client device 100 and is used for providing user authentication information for accessing a cloud gaming service, for example. The user interface may also be used to provide user selections and user interactions during game play. The processor 104 includes a stream processor 106 that is used to receive and process the streaming content received from a server, such as a cloud gaming server 320 or other content provider over a network 200. The stream processor 106 includes necessary logic to verify that the streaming content received from the server adheres to the communication protocol defined for the primary client device 100, and to process the content. The processor 104 may engage a decoder 108 that is available to the processor to decompress the encoded streaming data provided by the server 320. The decompressed data is forwarded to a data handler 110 within the processor 104 to analyze the data in order to identify the various data components and to separate the various data components of content. The streaming content (i.e., streaming video frame data) from the server 320 may include video frame data, audio data, haptic data, images, etc. The data handler 110 separates the various data components provided in the streaming content and forwards the different data components separately to the appropriate device components on the primary client device 100, for rendering. For example, the audio data component 110-a may be forwarded to a speaker for rendering, the video 110-b and image data component may be forwarded to the display for rendering, etc. User input, such as user selection, game interactions, etc., provided at the client device and captured by a user input module 107, is processed by the processor 104 and forwarded to the server 320, in response to the streaming content, so as to drive an outcome of a game, for example.

The primary client device 100 also includes a switching module 120 that is used to actively seek and detect secondary client devices that are in a vicinity of the primary client device 100 so as to present a handover option for a device handover for playing a game. The switching module 120 includes a plurality of sub-modules, such as a discovery agent 130, a device profile instructor 140 and a handover logic 150, to name a few. The discovery agent 130 is used to discover other client devices that are identified to be local to the primary client device. The discovery agent 130 uses various signals emitted by the client devices and/or protocols to seek other client devices. The discovery agent 130 will be described in more detail with reference to FIG. 4.

The device profile instructor 140 is used to signal to the secondary client devices that were discovered by the discovery agent 130 to establish a communication connection with a server of the cloud gaming system and get profiled, in some embodiments. In other embodiments, the device profile instructor 140 may signal the server of the cloud gaming system to establish a communication connection with the discovered secondary client devices and to profile each one of the secondary client devices. More details of the role of the device profile instructor 140 will be discussed with reference to FIG. 5.

The handover logic 150 is used to provide appropriate user interface to render a handover option and a list of secondary client devices that are qualified for game play of a game, in order to successfully perform a device handover. More details of the function of the handover logic 150 will be discussed with reference to FIGS. 6A, 6B, 6C-1 and 6C-2.

Figure 4:
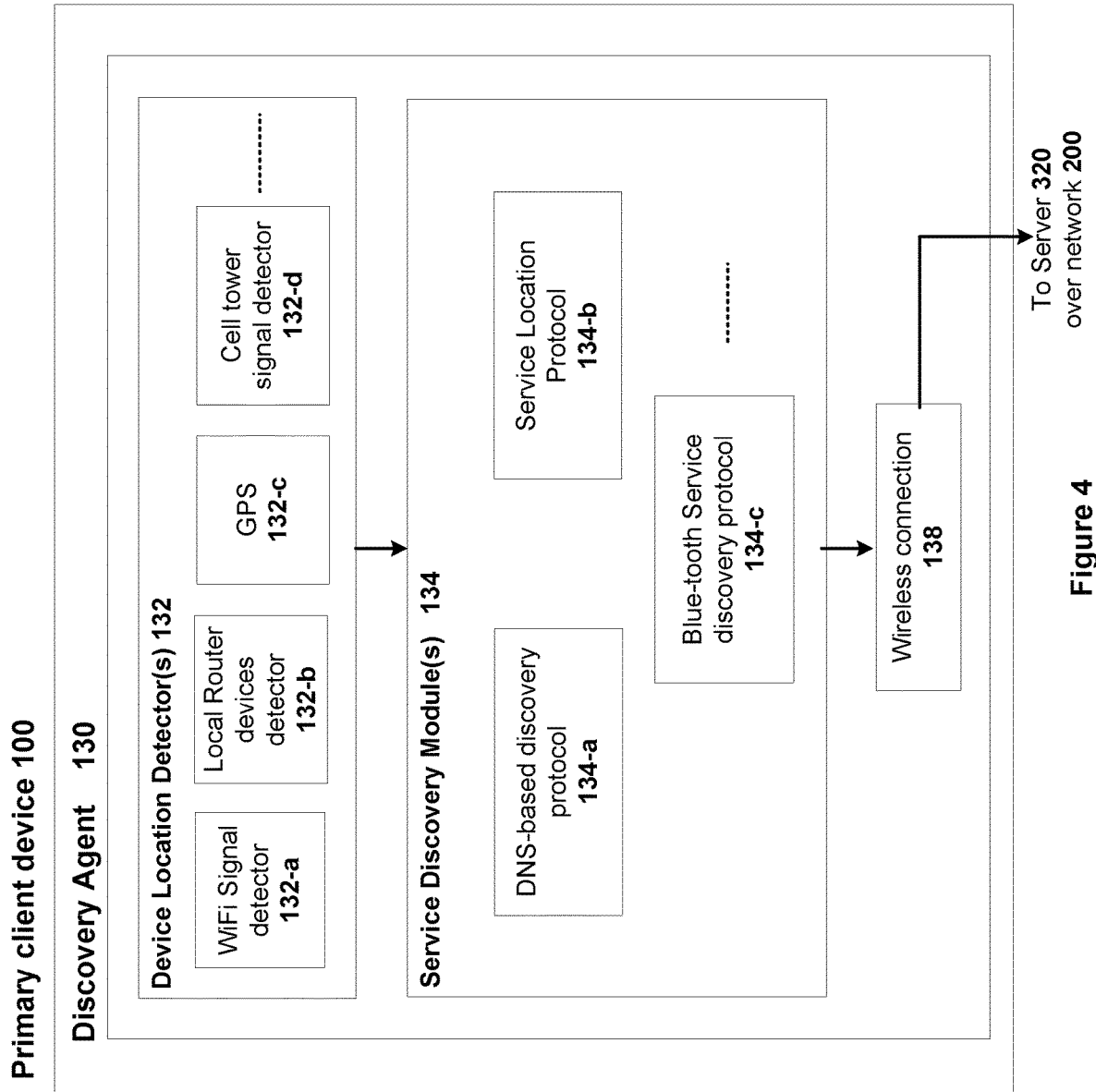
FIG. 4 illustrates an example discovery agent of the switching module in the primary client device for discovering secondary client devices that are local to the primary client device, in accordance to an embodiment of the invention.

FIG. 4 illustrates various sub-modules of a discovery agent 130 available on a client device 100 for seeking and discovering other client devices. The sub-modules of the discovery agent 130 may be broadly classified into two main sub-modules—a device location detector 132 and a service discovery module 134. The device location detector 132 is configured to identify a geo location of the primary client device by using signals emitted by the primary client device or by obtaining data from components within the primary client device or devices external to the primary client device. In a local network, such as a home network, various client devices, such as tablets, smart televisions, smart watches, mobile phones, cable television boxes, game consoles, etc., are all connected to the home network through an Ethernet connection (i.e., wired connection), a Wi-Fi (i.e., wireless) connection or a combination of both. As a result, the geo location of the primary client device may be determined, in one embodiment, by evaluating a Wi-Fi signal strength exhibited by the primary client device to one or more network access points within the network, and such evaluation may be performed using a Wi-Fi signal detector 132-a. In an alternate embodiment, a local router devices detector 132-b may query a local router device to obtain a list of client devices that are connected to the network through the router device. In still another embodiment, a global positioning service (GPS) tool 132-c implemented in the primary client device 100 may be used to pinpoint the geo location of the primary client device. In further embodiments, the geo location of the primary client device may be determined by interrogating signals between the primary client device and one or more cell towers, using a cell tower signal detector 132-d. This mode of detecting geo location of the primary client device may be useful when the primary client device is set up to interact with cell towers, such as a mobile phone. In some embodiments, a combination of the various device location detectors 132 may be used to determine the geo location of the primary client device 100 of the user.

Once the geo location of the primary client device is determined, one or more service discovery modules 134 may be used to actively seek and discover other client devices that are in the same network environment as the primary client device 100. For example, a Domain Name System (DNS) based protocol, such as a multicast DNS service discovery protocol 134-a, which is implemented across various devices, such as tablet computers, laptop computers, printers, etc., may be used to discover secondary client devices that are available within the network in which a primary client device operates. Alternately, a service location protocol 134-b may be used to detect secondary client devices in a local area network within which the primary client device operates. Other service discovery protocols may include a blue-tooth service discovery protocol 134-c for detecting Bluetooth enabled secondary client devices in a local area network of a primary client device, using wireless technology. The list of service discovery protocols provided herein are mere examples and that other service discovery protocols may be used to automatically seek and discover secondary client devices within a local network in which the primary client device operates. The various secondary client devices discovered using the different protocols are forwarded to the server 320 over network 200 using a wireless connection 138, for example. The server may receive the device identifiers of the discovered secondary client devices and establish a communication connection to exchange information that is used to identify device attributes and to profile the respective secondary client devices. Alternately, a signal may be sent to the various secondary client devices with a request to establish a communication connection with the server 320 and to exchange information with the server. The information exchanged with the server is used to generate the profile of the secondary client devices. The profiles generated for the secondary client devices are used to qualify the secondary client devices so that appropriate secondary client devices may be identified and provided as options for a device handover.

Figure 5:
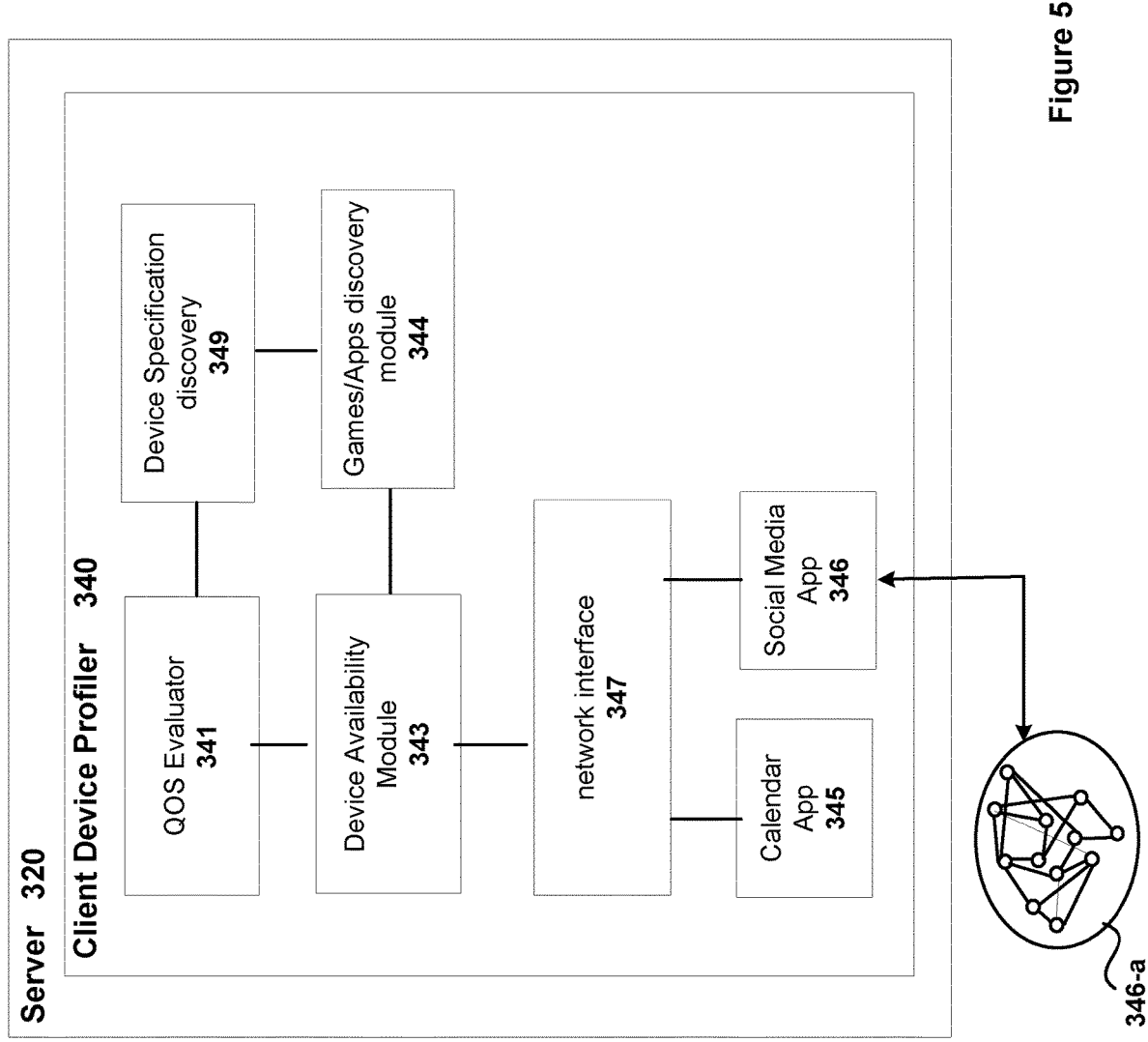
FIG. 5 illustrates an example client device profiler of a server, such as an application server, in a cloud gaming system that is used for profiling the secondary client devices, in accordance with an embodiment of the invention.

FIG. 5 illustrates an example client device profiler 340 that is used to qualify the secondary client devices that were discovered to be local to the primary client device, in order to provide options of qualified secondary client devices for a device handover, in one embodiment. The client device profiler 340 (of FIG. 2) within the server 320 receives signal(s) to profile one or more secondary client devices discovered by the primary client device 100 using various device discovery protocols, and such signals may be received from either a device profile instructor 140 of a client device or from one or more secondary client devices. In response to the signal(s), the client device profiler 340 establishes communication connection and begins exchanging information with the respective secondary client devices. Various sub-modules within the client device profiler 340 may be used for obtaining the information from the secondary client devices. For example, a quality of service (QOS) evaluator 341 may be used to obtain QOS information from the secondary client device. The QOS information may include network bandwidth information, frame rate, streaming capability, and other network related information, such as ping time, packet loss, link type (i.e., network connections using WiFi, Ethernet, Long Term Evolution (LTE) technology, etc.) etc., that affect game play experience of a user. In some embodiments, the QOS information may be used to organize the secondary client devices discovered by the primary client device. In other embodiments, the information exchanged between the secondary client devices and the client device profiler 340 may be used to organize the secondary client devices. For example, the device attributes may be ranked in accordance to the device attribute requirements of a game. A game that is process intensive may rank processor speed higher than other device attributes and a game that is graphic intensive may rank network bandwidth higher than other device attributes. The QOS evaluator 341 may rank the device attributes in accordance to the requirements of a game and use this ranking of the device attributes in identifying and qualifying secondary client devices discovered by a primary client device, for a device handover. In some embodiments, the qualified list of secondary client devices are organized in a list in accordance to level of matching of device attributes of the secondary client devices to the ranked device attributes.

A device specification discovery 349 may be used to determine the hardware and software specification of the secondary client device including, but not limited to, type and version of operating system, type of processor, processor speed, type and amount of memory, etc. The device specification may be used for categorizing the secondary client device and for packaging the streaming video frames for forwarding to the secondary client device.

A device availability module 343 may be used to determine the availability of each of the secondary client devices discovered by the primary client device. Device availability may drive the selection of qualified secondary client devices for providing as options for a device handover. Some or all of the secondary client devices may be connected to the local network at the time of discovery. One or more of the secondary client devices may be committed to provide services for an event, such as a calendar event, a user action event, etc. When the event occurs, the resources of the one or more secondary client devices that were committed to provide service for the event may be engaged during the event and those secondary client devices are shown to be in a 'busy' state. In order to determine if a particular secondary client device is available during a device handover, the device availability module 343 is configured to query an event mechanism (not shown) to determine the various events for which the resources of a secondary client device may be used or is committed. The event mechanism, in one embodiment, may be configured to query and obtain information related to the events from various scheduling sources in order to identify secondary client devices for a device handover during a game session.

It should be noted that the device availability information can be used to determine which ones of the secondary client devices are available during a device handover at a time when a handover option is received from the primary client device. Alternately, the device availability information may be used to determine which ones of the secondary client devices are scheduled to be busy for a game play session that is scheduled for some time in the future. An interface, such as a network interface 347, may be used to provide interface logic and/or APIs to query the different scheduling applications, such as a calendar application 345, a social media application 346, an email application, etc., to determine if any event has been scheduled for a current time or a time when a game play session is being scheduled for which resources of a particular secondary client device has been committed or is required. For example, if a user committed to play an online multiplayer game through a social media post for the current time, the event mechanism may be able to extract such information by querying the social media application 346, which relies on one or more social graphs 346-*a* to identify social contacts. Identity of the social contacts may be used to determine which social posts/feeds to monitor or query to obtain the user's social commitment of playing the game. Similarly, if a user has a calendar entry for playing the online multiplayer game on every Friday at 8:00 p.m., the event mechanism may be able to extract such information from the calendar application 345 or from an email application or a calendar option in a social media or other scheduling sources. The device availability module 343 analyzes the various events that a particular secondary client device has been committed to in order to determine which ones of the identified secondary client devices are available for including in a device handover option. Scheduling information obtained from the device availability module 343 is used for identifying and qualifying the secondary client devices provided as options with a handover option. Of course, the secondary client devices that are identified have device attributes to provide optimal game play experience for the user.

A game/apps discovery module 344 is used to determine the various applications and/or games that are available at the data center that is assigned for the game play session of a game. Each data center, as shown in FIG. 1, includes a plurality of games that are available or are set up for playing. The plurality of servers provides the necessary resources for playing the games available in each data center. The game/apps discovery module 344 is configured to determine the list of games that are available and to determine if any game needs to be provisioned at the data center to enable game play. If a particular game is not available at the data center, the cloud gaming system 300 may provision the game at the data center so that when and if the game is selected for game play, an instance of the game may be retrieved from the games title data store 314, executed on a server of the data center and game content streamed to the primary and the secondary client devices. Similarly, if a secondary client device does not have one or more device attributes or if the device attributes are not to the level required for game play of a game, the game/apps discovery module 344 may identify such attributes and the cloud gaming system 300 may be used to provision those attributes to qualify the secondary client device for playing the game. The client device profiler 340 uses the information gathered by the various sub-modules to generate device profile of the various secondary client devices that were discovered to be local to the primary client device.

FIG. 6A illustrates an example device profile that is generated by the client device profiler 340 for all the secondary client devices that are identified to be local to the primary client device. The device profile identifies the secondary client devices using device identifiers, and lists out the various device attributes of the secondary client devices. For simplicity sake, the device identifiers of the secondary client devices are listed in numerical order whereas in reality the device identifiers are unique identifiers that can be used to distinctly identify each client device. The number of secondary client devices and specific device attributes has been provided as examples and should not be considered limiting. Fewer or greater number of device attributes may be identified in the device profile generated by the client device profiler 340.

The profile generated by the client device profiler 340 may be used by the handover manager 330 at the server 320 to qualify the secondary client devices and to identify specific ones of the secondary client devices that are qualified for providing with a handover option for a device handover, during game play of the game. The qualified secondary client devices are returned with a handover option to the primary client device 100 for rendering and user selection.

Figures 1, 6C:
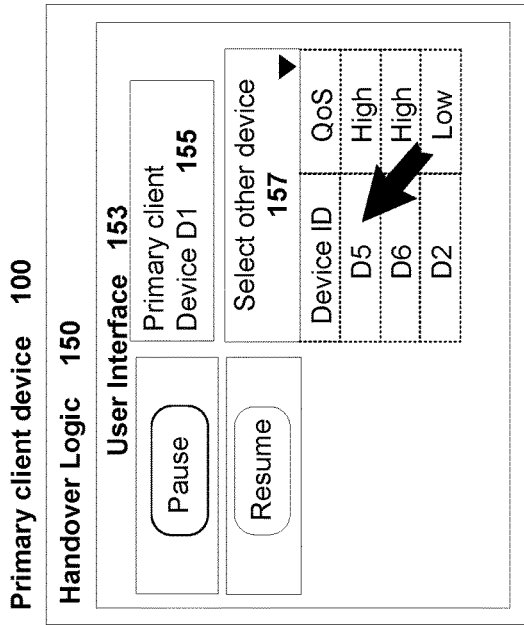
Figures 2, 6C:
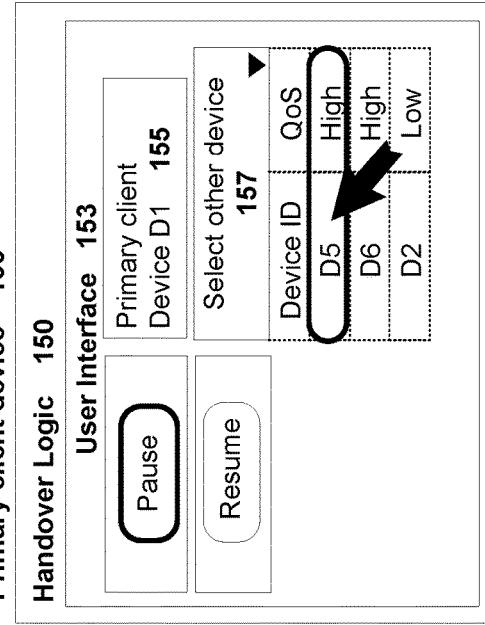
Figure 6B:
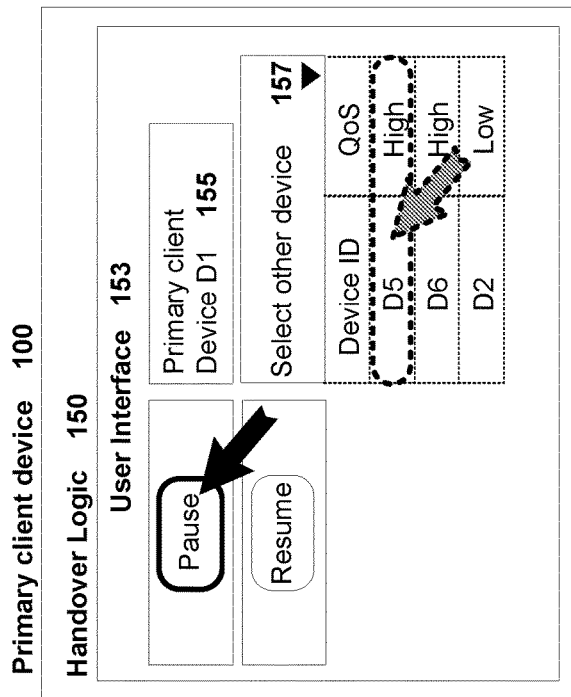

FIGS. 6B, 6C-1 and 6C-2 show different examples of user interface that are rendered on a display of the primary client device. A handover logic 150 at the primary client device 100 receives the handover option and the list of qualified secondary client devices from the handover manager 330 at the server 320 and presents the handover option with the list of qualified secondary client devices in a user interface 153 for user selection. The user interface identifies the various options that are available to a user (i.e., "Pause" or "Resume"). Further, the user interface provides the device identifier of the primary client device (D1), as shown in box 155, and a list of qualified secondary client devices under "select other device" option 157. FIG. 6B illustrates the user interface 153 rendered on a display of the primary client device, in one embodiment. The list of secondary client devices provided under option 157 for user selection is a subset of secondary client devices (illustrated in FIG. 6A) that were provided by the client device profiler 340 and, in one embodiment, is organized in accordance to the device attributes of the respective secondary client devices as compared with the device attribute requirements of the game.

A user selection of a "Pause" option, as shown by the black cursor, would result in a signal being sent to the handover manager 330 at the server 320 to pause game play of the game. The handover manager 330, in response, would result in sending instructions to the game execution engine 324 to suspend streaming video frames to the primary client device. The handover manager 330 further sends a signal to the pause manager 334 to save a game state of the game play to enable restart of the game play of the game from the point where it was paused. The game state of the game play is saved by a state data manager 338. A user selection of a secondary client device, as illustrated by the gray dotted cursor, would cause the secondary client device to be identified as the handover device to which the game play has to be streamed, if and when a user decides to resume game play at the selected secondary client device. The user selection of pause option would also result in a "Resume" option to be forwarded to the selected secondary client device. User selection of the resume option at the secondary client device is forwarded to the handover manager 330 at the server 320. The handover manager 330, in turn, would instruct the resume manager 332 to resume game play of the game. The resume manager 332 would instruct the game execution engine to retrieve the game state from the state data manager 338 and restart the game from a restart point that is saved in the state data manager 338. The handover manager 330 sends a signal to update the primary client device identifier to reflect the selected secondary client device identifier, so that the game execution engine 324 can use the device identifier of the selected secondary client device to stream the video frames for the restarted game.

FIGS. 6C-1 and 6C-2 provide an alternate way of selecting a secondary client device as the handover device, in one embodiment of the invention. As illustrated in FIG. 6C-1, a user may select one of the secondary client devices from select device option 157, as illustrated by the black cursor, for a device handover, instead of selecting the "Pause" option. The user selection of the secondary client device would automatically cause the selected device to be highlighted in the select device option 157 and the pause option to get activated, as illustrated by the highlighted "Pause" option in FIG. 6C-2. The process of pausing the game play of the game, saving the game state and providing a "Resume" option, in response to the user selection of secondary client device, is similar to what was discussed with reference to FIG. 6B. Game play may resume if and when the user selects the resume option from the secondary client device.

The various embodiments discussed herein allows a primary client device to use various protocols and signal detectors implemented in each of the client devices to actively seek and discover secondary client devices that are local to the primary client device. The protocols and technology available within each client device, in some embodiments, enables an actively engaged client (i.e., primary client device) that is receiving streaming content from a content provider (e.g., gaming server) to discover other dormant client devices that are eligible to receive streaming content, other idling client devices (e.g., client devices with idling socket waiting for messages) that could be woken up to become a client that can receive streaming content, or a standby client that is eligible for receiving streaming content but is currently performing limited work like recording a show, or downloading some content. In some embodiments, the actively engaged client may prompt other client devices to exchange information (e.g., session information, QOS information, device capabilities, game being played, video codec information, etc.) and initiate preparation work for a streaming session. This could include monitoring network bandwidth. If the actively engaged client is a table computer that is running low on battery power, a trigger event (i.e., low batter trigger event) may occur prompting a user interface to appear on the tablet computer suggesting to the user to switch or move game play to another client device. The suggestion may include other client devices that are local to the tablet computer that can be used for game play and these client devices are included in the suggestion based on their profile.

Various ways to determine location of the primary client device may be engaged. For example, in one embodiment, for a wireless primary client device, Wi-Fi signal strength to one or more multiple access points within a home network or even access points of neighbors may be used to determine the location within a user's house. In other embodiments, GPS data may be used to determine position of the primary client device. Such position information, for example, could be used to determine if a user is entering a room in which another client device resides. The user entering the room could act as a trigger to test network connectivity of the other client device for streaming content. If the test identifies that the QOS of the other client device is really good, then a device handover option may be presented on the primary client device informing the user that the other client device may be able to provide better game play experience—e.g., higher resolution, higher framerate, lower latency, etc., recommending the user to switch. User selection of the other client device at the option presented would make the switch happen.

Oftentimes, the various personal client devices are continuously connected to a network services, such as a gaming network, a social media network, a content provider network, etc. Such network services may keep track of the various personal client devices of a user, the geo location of the client devices, and network connectivity. For instance, if a user is playing a game on a mobile phone using an online service, such as a gaming network, the online service may be able to determine location of the client device using signals generated by the mobile phone, such as GPS signal, cell tower signals, Wi-Fi hotspots, etc., and communicate with other client devices in a private or local network, such as a home network of the user. The other client devices in the local or private network (e.g., home network) may periodically connect to the gaming network or other online services and be made aware of the geo location of the mobile phone of the user that is being used for playing the game. If the gaming network detects that the user of the mobile phone is close to home, this may initiate a trigger event to validate the network bandwidth and other QOS attributes of the mobile phone, as well as the network bandwidth of the other client devices in the home network. This pre-establishment of device attributes of the mobile phone and other client devices within a network may assist in a faster and frictionless device switch, if and when a user requests a device handover, as the preliminary work to qualify the devices has already been done prior to receiving the switch request.

In some embodiments, a calendar event may be queried by an event mechanism, for example, to identify an appointment that a user made for an online multiplayer session through a game network. The identification of the calendar event may trigger preparation of the various client devices (primary and one or more secondary client devices) for a streaming session. Assuming that a client device is not being used for streaming content yet, mere detection of a planned event could trigger profiling and qualifying of the client devices (primary and secondary client devices) in a local network. This would include provisioning services and attributes to get the primary and/or one or more secondary client devices ready for the streaming session ahead of time, and such provisioning is done in anticipation that at least one of the client devices will be selected for playing the game when the calendar event occurs.

The various embodiments describe ways to enable a current primary client device to look for opportunities to reach out to all potential secondary client devices that a user may transfer the streaming session of game play. Particularly, the primary client device may engage in background QOS and profiling of secondary client devices to obtain state of various device attributes and such background QOS and profiling may be done at particular times when the primary client device is detected to be idle, or on a fixed duty cycle, or periodically or in response to trigger events, etc. The profiling is done before a user initiates a change, such that when and if the user decides to select a device handover option, a faster, frictionless change can occur as the secondary client devices have already been profiled and, in some embodiments, the codec settings and/or other device attributes have been or can be pre-established for a quick stream switch.

If a particular secondary client device has a pattern of use, such use may influence a pattern of QOS. By profiling the secondary client devices, the primary client device is made aware of such pattern of use, which can be helpful for qualifying the secondary client devices for switching. For example, the profile may identify a secondary client device having confidence intervals where the likely known QOS is high. This information can be used to invoke pre-tested codec and other stream settings (i.e., device attributes that enable streaming of video frames or content), when and if the secondary client device is selected for a device handover. In another example, if a secondary client device has an unpredictable process load (CPU load) during work hours, then new QOS testing may have to be performed every time a changeover event is initiated.

In some embodiments the profiling information generated for the various secondary client devices may be used to determine if there are other secondary client devices in the local or private or home network that are already set up to receive streaming video frames of a game that are currently directed to a primary client device. The user may be provided with a handover option with device identifiers of the secondary client devices that are already set up for receiving the streaming video frames of the game. In some embodiments, a new QOS test may be performed before the handover is performed. In alternate embodiments, the existing QOS test that was used to qualify the secondary client devices may be relied on and the device handover effectuated without performing additional QOS test, so long as the secondary client devices and the primary client device remain in the same network. In some embodiments, the primary client device may be any one of a personal computer, a tablet computer, a mobile phone, a desk top computer, a television, etc. The secondary client device may be a head mounted display. Alternately, the primary client device is a head mounted display and the secondary client device selected for device handover may be any one of a personal computer, a tablet computer, a mobile phone, a desk top computer, a television, etc. In other embodiments, the primary client device and the secondary client devices may both be head mounted displays.

For more information on how progression of a user in the game is used to re-create the game state of the game, in one embodiment, reference can be made to U.S. application Ser. No. 12/917,388, filed on Nov. 1, 2010, and titled, "USER INTERFACE, SYSTEM AND METHOD FOR CONTROLLING A VIDEO STREAM," which is incorporated herein by reference in its entirety. The process of re-creating game state defined above is one possible way and that other ways of re-creating the game state of the game may also be employed. For more information on video generation and distribution, reference can be made to U.S. application Ser. No. 12/790,955, filed on May 31, 2010, and titled, "GAME EXECUTION ENVIRONMENT," (since issued as U.S. Pat. No. 8,506,402) which is incorporated herein by reference in its entirety. For more information related to server-side generation and/or rendering of game video, reference can be made to U.S. application Ser. No. 12/791,819, filed on Jun. 1, 2010, and titled "QUALIFIED VIDEO DELIVERY," which is incorporated herein by reference in its entirety. For more information related to server-side execution of computer programs, reference can be made to U.S. application Ser. No. 13/231,751, filed on Sep. 13, 2011, and titled "ADD-ON MANAGEMENT SYSTEMS," which is incorporated herein by reference in its entirety.

Figure 7:
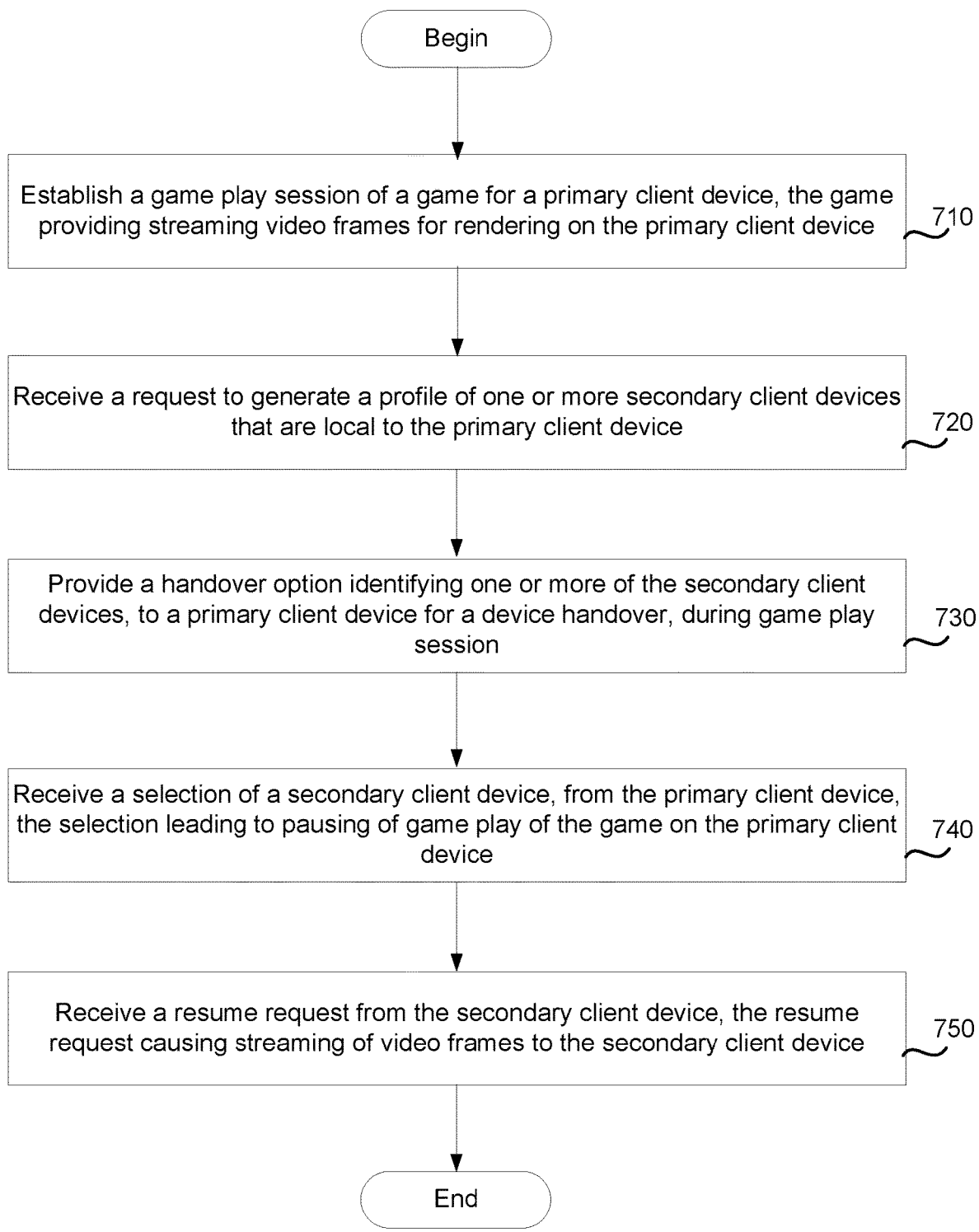
FIG. 7 illustrates an example flow of operations of a method used for identifying options of secondary client devices for device handover of game play, in accordance with an embodiment of the invention.

FIG. 7 illustrates the various method operations used for identifying options of secondary client devices that can be used for a device handover of game play, in one embodiment of the invention. The method begins at operation 710, wherein a session of game play of a game is established for a primary client device, in response to a request for playing the game received from the primary client device. The primary client device may be used to access a cloud gaming system via a user account to identify a game for game play. A server in the cloud gaming system authenticates the user and the game play request, and establishes the game play session by executing an instance of the game for streaming video frames of the game to the primary client device. The video frames may be encrypted using an encoder available on the server prior to being streamed to the primary client device.

A request is received to generate a profile of one or more secondary client devices, as illustrated in operation 720. The secondary client devices may be discovered by the primary client device using signals generated by the secondary client devices and/or through one or more device discovery protocols implemented within the secondary client devices. The request for generating the profile may be initiated by the primary client device by sending a signal to the secondary client devices to establish a communication connection with the server and get profiled. Alternately, the primary client device may send a signal to the server with device identifiers of the secondary client devices that are discovered local to the primary client devices and request the server to establish communication connection with the secondary client devices and exchange information to generate a profile of the respective secondary client devices. The server, in response to the signal, exchanges information with the secondary client devices using the established communication connection, identifies one or more device attributes and generates a profile of each of the secondary client devices using the respective device attributes. Information provided in the profile is used to qualify the secondary client devices for game play of the game.

A handover option is provided to the primary client during the game play, as illustrated in operation 730. The handover option is configured to identify the one or more secondary client devices that are qualified for playing the game, based on the generated profile. The handover option is presented on a user interface at the primary client device for user selection.

User selection of a secondary client device is received from the primary client device, as illustrated in operation 740. In response to receiving the user selection of the secondary client device, the game play is paused and a game state of the game play is saved by the server. The pausing of game play leads to pausing streaming of video frames to the primary client device. In response to pausing of the game, a resume option is provided on the secondary client device to resume playing of the game on the secondary client device.

User selection of a resume request from the secondary client device is received by the server, as illustrated in operation 750. In response to the resume request, the server is configured to access the saved game state of the game and to continue the play of the game on the secondary client device. The resume request causes the server to stream video frames of the resumed game to the secondary client device. The secondary client device is designated as the primary client device so that the streaming video frames may be directed to the secondary client device instead of the primary client device. The device handover is performed in a fast and seamless manner with minimal latency, enabling the user of the primary and secondary client device to enjoy comparable or enhanced game play experience.

In some embodiments, the device switch may, depending on device attributes of the selected secondary client device, allow a user to have a better gameplay experience than what was provided by the primary client device, such as higher resolution, higher framerate, lower latency, etc. Alternately, the device switch may provide ways to continue game play without significant change in game play experience. This might be the case when the device switch is effectuated in response to a trigger event, such as low battery power detected in the primary client device, for example.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Figure 8:
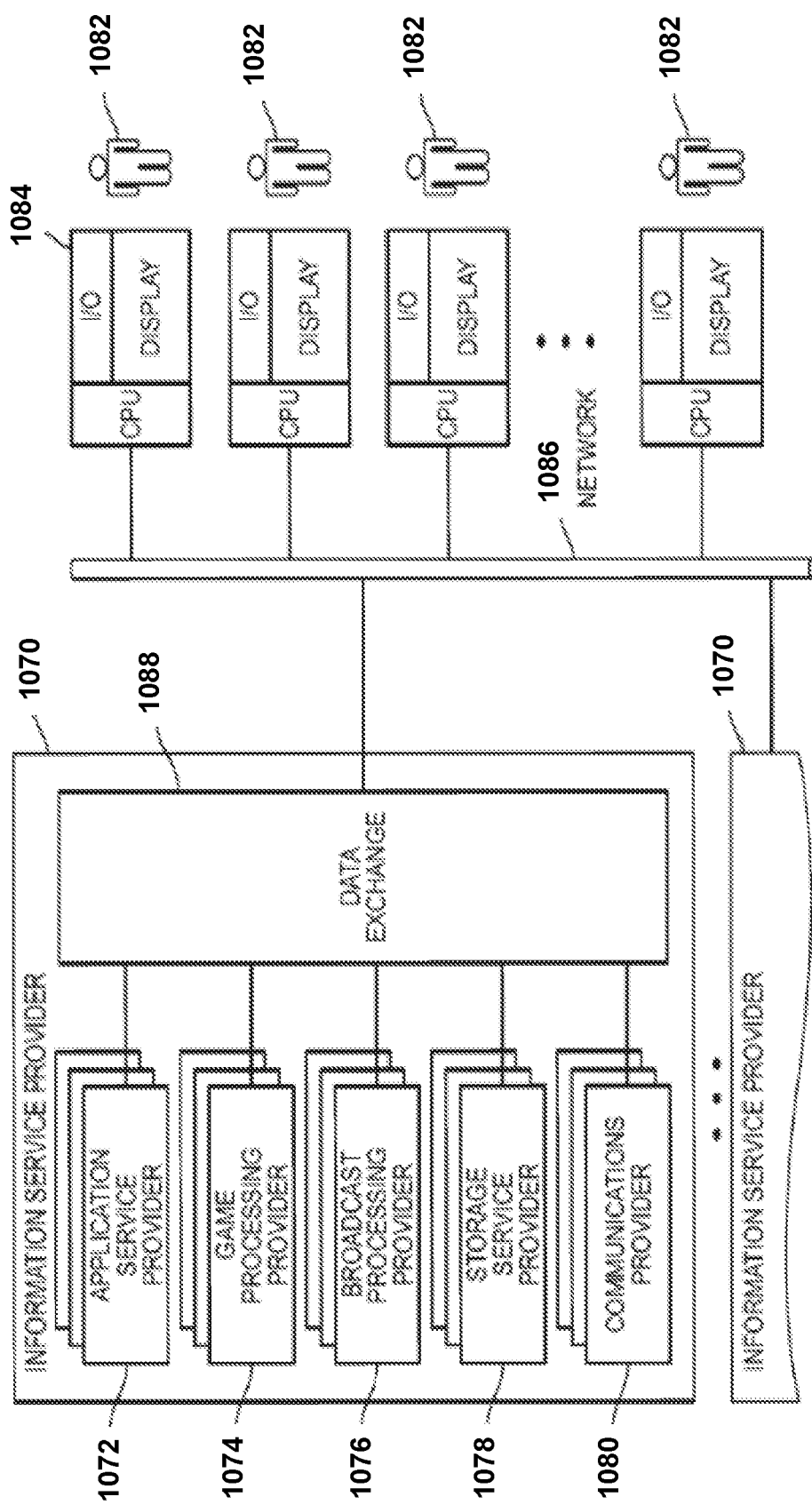
FIG. 8 illustrates an example Information Service Provider architecture for delivering informational content and services to users who are geographically dispersed and connected via network, in accordance with one embodiment of the present invention.

FIG. 8 illustrates an embodiment of an Information Service Provider architecture that may be used in providing access to different games. Information Service Providers (ISP) 1070 deliver a multitude of information services to users 1082 geographically dispersed and connected via network 1086. Although the various embodiments have been discussed with reference to providing fast access to games, the embodiments can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP (i.e., during switching of data center assigned to the user) as the client moves around the world and such transfer may be based on a compatibility of services provided by the respective ISPs to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GaPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as HTML, to access ISP 1070.

Figure 9:
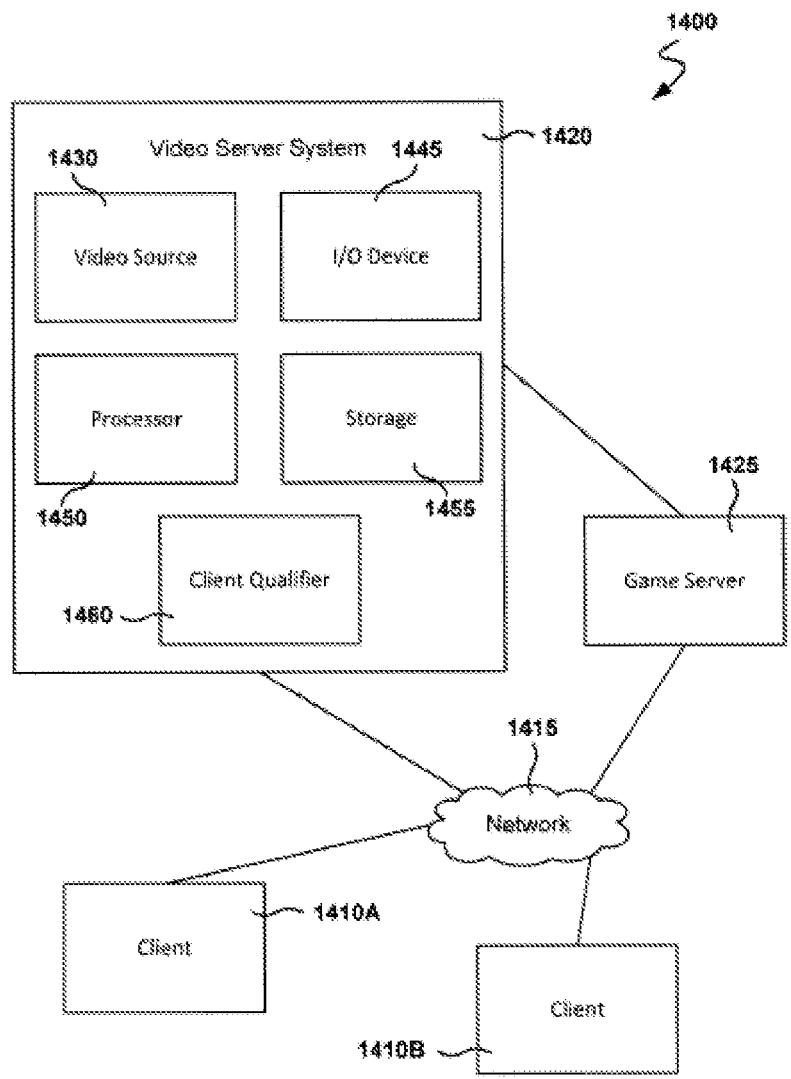
FIG. 9 illustrates a simplified block diagram of an example Game System, in accordance with various embodiments of the invention.

FIG. 9 is a block diagram of a Game System 1400, according to various embodiments of the invention. Game System 1400 is configured to provide a video stream to one or more Clients 1410 via a Network 1415. The Network is similar to the Network 200 illustrated in FIG. 1. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change instantly with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. The clients described are similar to clients 100-1 through 100-*n* of FIG. 1. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415 (similar to Network 200 of FIG. 1). Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is Video Server System 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and Storage 1455 (including non-transitory analog and/or digital storage devices). Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720 p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments, Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1455 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

With the above embodiments in mind, it should be understood that the invention may employ various computer-implemented operations involving data stored in computer systems. These operations include operations requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable programming code on a computer-readable medium. Alternately, the computer readable programming code may be downloaded from a server using the data exchange interconnects described above. The computer-readable medium is any data storage device that can store data which can be thereafter read by a computer system, including an electromagnetic wave carrier. Examples of the computer-readable medium include hard drives, network attached storage (NAS), read-only memory, random-access memory, CD-ROMs, CD-Rs, CD-RWs, magnetic tapes, and other optical and non-optical data storage devices. The computer-readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method executed by a server of a cloud gaming system, comprising:
    establishing a session of game play of a game and provide game content to a primary client device;
    detecting a trigger event at the primary client device, the trigger event causing a discovery of one or more secondary client devices that are local to the primary client device;
    generating device profile of each secondary client device that is local to the primary client device, the device profile identifying device attributes of the secondary client device;
    matching the device attributes of the one or more secondary client devices to device attribute requirements for the game to identify select ones of the one or more secondary client devices with device capabilities for interacting with the game;
    providing a handover option to the primary client device, the handover option including a list of the select ones of the secondary client devices for selection; and
    establishing communication connection with a secondary client device selected from the list, in response to selection of the secondary client device, the establishing of communication connection includes switching streaming of game content to the selected secondary client device for rendering.

2. The method of claim 1, wherein the game content includes a plurality of components, and
    wherein switching streaming of game content includes selectively switching a component of the game content to the secondary client device and retaining streaming of other components of the game content to the primary client device, the switching of the component provided in the handover option at the primary client device.

3. The method of claim 1, wherein switching streaming includes handing over of communication connection of a wireless controller from the primary client device to the secondary client device, and
    wherein handing over the communication connection includes automatically disconnecting the wireless controller from the primary client device and automatically connecting the wireless communication to the secondary client device.

4. The method of claim 1, wherein switching streaming includes providing a notification to the secondary client device to automatically discover wireless controller using device attributes of the wireless controller, and
    forming an association with the wireless controller so that the selected secondary client device can provide input using the associated wireless controller.

5. The method of claim 4, wherein forming an association includes mapping input method of the wireless controller for providing input to the game.

6. The method of claim 4, wherein forming an association includes switching input method for providing interactions using the primary client device to input method used by the second secondary client device, when the input method of the secondary client device varies from the primary client device.

7. The method of claim 4, wherein forming an association includes providing an input emulation with input controls that are defined for a type of the secondary client device at a display portion of the secondary client device, the input emulation used for providing game inputs.

8. The method of claim 1, wherein the trigger event is initiated upon detecting any one of insufficient power, or increased latency, or calendar event, or social media event, or change in one or more device attributes of the primary client device.

9. The method of claim 1, wherein the trigger event is initiated by the primary client device, in response to detecting insufficient resource at the primary client device for playing the game.

10. The method of claim 1, wherein the secondary client device selected from the list is designated as a new primary client device.

11. The method of claim 1, wherein the list of select ones of the secondary client devices included in the handover option is identified based on location information associated with the primary client device and the secondary client devices.

12. A cloud gaming system, comprising:
a server configured to execute a plurality of games, the server including,
a game execution engine configured to identify game code of a game selected for playing at a first client device associated with a user account, and execute the game code to generate streams of video frames for the game;
a client device profiling module configured to,
detect a trigger event at the primary client device during game play of the game, the trigger event automatically initiating discovery of one or more second client devices local to the first client device;
generate device profile of each of the one or more second client devices that are local to the first client device, the device profile identifying device attributes of the second client device;
match the device attributes of the one or more second client devices to device attribute requirements for the game to identify select ones of the second client devices with device capabilities for interacting with the game;
provide a handover option to the first client device, the handover option including a list of the select ones of the second client devices for selection; and
a handover manager configured to,
detect selection of a second client device from the list included in the handover option; and
responsive to selection, establish communication connection between the second client device and the server, the establishing of communication connection includes switching streaming of video frames of the game play of the game from the first client device to the second client device.

13. The cloud gaming system of claim 12, wherein the handover manager is configured to,
communicate a pause signal to a pause manager to stop streaming the video frames to the first client device; and
communicate a resume signal to a resume manager to start streaming the video frames of the game to the second client device,
wherein the pause signal to the pause manager and the resume signal to the resume manager is in response to the trigger event detected.

14. The cloud gaming system of claim 13, wherein the game execution engine is configured to communicate with a state data manager to obtain a point from where the game play is to be resumed at the second client device, based on game state of the game.

15. The cloud gaming system of claim 12, wherein the handover manager is configured to update device identifier at the game execution engine from a first client device identifier to a second client device identifier, in response to the switch in the streaming of the video frames.

16. The cloud gaming system of claim 12, wherein the handover manager is configured to switch from a first input method of providing interactions to the game followed by the first client device to a second input method of providing interactions to the game followed by the second client device, when the first input method varies from the second input method.

17. The cloud gaming system of claim 12, wherein the handover manager is configured to provide an input emulation with input controls defined for a type of the second client device at a display portion of the second client device, the input emulation used for providing game inputs to the game.

* * * * *